United States Patent
Krymski

(10) Patent No.: US 8,174,603 B2
(45) Date of Patent: May 8, 2012

(54) IMAGE SENSORS AND METHODS WITH ANTIBLOOMING CHANNELS AND TWO SIDE DRIVING OF CONTROL SIGNALS

(76) Inventor: Alexander Krymski, Pasadena, CA (US)

(*) Notice: Subject to any disclaimer, the term of this patent is extended or adjusted under 35 U.S.C. 154(b) by 537 days.

(21) Appl. No.: 12/405,903

(22) Filed: Mar. 17, 2009

(65) Prior Publication Data

US 2009/0273696 A1    Nov. 5, 2009

Related U.S. Application Data

(60) Provisional application No. 61/049,741, filed on May 1, 2008.

(51) Int. Cl.
*H04N 3/14* (2006.01)
*H04N 5/335* (2011.01)
*H04N 5/217* (2011.01)
*H01L 27/146* (2006.01)

(52) U.S. Cl. ........................ 348/308; 348/241; 257/445

(58) Field of Classification Search .................. 348/241, 348/294, 308, 256; 257/445
See application file for complete search history.

(56) References Cited

U.S. PATENT DOCUMENTS

| | | | |
|---|---|---|---|
| 5,757,520 A | 5/1998 | Takashima | |
| 6,115,065 A | 9/2000 | Yadid-Pecht et al. | |
| 6,137,432 A | 10/2000 | Xiao | |
| 6,259,124 B1 | 7/2001 | Guidash | |
| 6,545,624 B2 | 4/2003 | Lee et al. | |
| 6,552,745 B1 | 4/2003 | Perner | |
| 6,573,936 B2 | 6/2003 | Morris et al. | |
| 6,661,457 B1 | 12/2003 | Mathur et al. | |
| 6,670,904 B1 | 12/2003 | Yakovlev | |
| 6,870,565 B1 | 3/2005 | Blerkom et al. | |
| 6,953,923 B2 | 10/2005 | Yang et al. | |
| 7,238,977 B2* | 7/2007 | Hong et al. | 257/292 |
| 7,408,443 B2 | 8/2008 | Nam | |
| 7,488,928 B2 | 2/2009 | Krymski | |
| 7,489,357 B2 | 2/2009 | Nakada | |
| 7,659,925 B2 | 2/2010 | Krymski | |
| 7,880,786 B2 | 2/2011 | Muramatsu | |
| 2003/0011829 A1 | 1/2003 | Dierickx | |
| 2003/0043089 A1 | 3/2003 | Hanson et al. | |
| 2005/0237408 A1 | 10/2005 | Muramatsu | |

(Continued)

FOREIGN PATENT DOCUMENTS

JP    2001-024954    1/2001

OTHER PUBLICATIONS

Office Action dated Sep. 2, 2010 from U.S. Appl. No. 12/643,875.

(Continued)

*Primary Examiner* — Alicia M Harrington
(74) *Attorney, Agent, or Firm* — Foley & Lardner LLP

(57) ABSTRACT

An image sensor of various embodiments includes a pixel array. The pixel array includes a pixel having a photodiode and a transfer gate. The pixel array in various embodiments further includes an antiblooming channel extending from the photodiode to either (i) a pixel output area, or (ii) a drain of a source follower transistor. A method of some embodiments includes (i) driving from a first row driver one or more control signals over one or more control lines to one or more pixels, and (ii) driving from a second row driver the one or more control signals over the one or more control lines to the one or more pixels.

40 Claims, 24 Drawing Sheets

U.S. PATENT DOCUMENTS

2007/0076109 A1 4/2007 Krymski
2007/0139242 A1 6/2007 Krymski

OTHER PUBLICATIONS

Office Action dated Sep. 18, 2008 from U.S. Appl. No. 11/243,239.

Examiner Initiated Interview Summary and Office Action dated Aug. 24, 2009 from U.S. Appl. No. 11/243,239.

Notice of Allowance dated Dec. 14, 2009 from U.S. Appl. No. 11/243,239.

A. Krymski et al., "A High Speed, 500 Frames/s, 1024×1024 CMOS Active Pixel Sensor", 1999 Symposium on VLSI Circuits Digest of Technical Papers, 1999, Kyoto, Japan, pp. 137-138.

S. Kleinfelder, S.H. Lim, X.Q. Liu and A. El Gamal, "A 10,000 Frames/s CMOS Digital Pixel Sensor," IEEE Journal of Solid State Circuits, vol. 36, No. 12, pp. 2049-2059, Dec. 2001.

PCT International Search Report and Written Opinion report dated Aug. 29, 2007 from PCT application PCT/US06/38643.

Non-Final Office Action dated Jan. 30, 2009 for U.S. Appl. No. 11/243,239.

Office Action dated Jul. 21, 2009 from U.S. Appl. No. 11/243,239.

* cited by examiner

IMAGE SENSORS AND METHODS WITH ANTIBLOOMING CHANNELS AND TWO SIDE DRIVING OF CONTROL SIGNALS

CROSS-REFERENCE TO RELATED PATENT APPLICATIONS

This application claims the benefit of U.S. Provisional App. Ser. No. 61/049,741, entitled "Image Sensor Circuits, Pixel Circuits, Pixel Readout Circuits, and Methods with Same", filed May 1, 2008, the entire contents of which are incorporated by reference herein.

This application is related to U.S. patent application Ser. No. 11/243,239, entitled "High Speed CMOS Image Sensor Circuits with Block Memory Readout", filed Oct. 4, 2005, the entire contents of which are incorporated by reference herein. This application is also related to U.S. patent application Ser. No. 11/774,505, entitled "Image Sensor Circuits and Methods with Multiple Readout Lines Per Column of Pixel Circuits", filed Jul. 6, 2007, the entire contents of which are incorporated by reference herein.

BACKGROUND INFORMATION

1. Field of the Invention

Embodiments of the present invention relate generally to image sensors and methods and, in specific embodiments, to image sensors that allow for antiblooming to drain excess charge from photodiodes and that allow for the driving of control signals to pixels.

2. Related Art

Image sensors have found wide application in consumer and industrial electronics, and have enabled an explosion in a number of digital cameras and digital video devices used for work and entertainment. In many applications, and especially in industrial applications, there is a constant demand for image sensors with faster processing speed and better image quality. Thus, it is advantageous to develop new architectures that allow for improved performance of image sensors.

FIG. 1 illustrates an architecture of a related art image sensor 1. As illustrated in FIG. 1, the image sensor 1 comprises a pixel array 8 and a row driver 29. The pixel array 8 comprises pixels 2 that are arranged in rows and columns. Each pixel 2 comprises a light sensitive element, such as a photodiode, or the like, to sample light intensity of a corresponding portion of a scene being imaged, and each pixel 2 is configured to produce an analog pixel signal based on the sampled light intensity. The row driver 29 supplies control signals to the pixels 2 in the pixel array 8 to control an operation of the pixels 2.

Pixels 2 that are in a same row of the pixel array 8 share common row control signals from the row driver 29. For example, pixels 2 in a first row of the pixel array 8 share common row control lines $21_1$ for receiving control signals from the row driver 29. Similarly, pixels 2 in a second row of the pixel array 8 share common row control lines $21_2$ for receiving control signals from the row driver 29, and pixels 2 in an $h^{th}$ row of the pixel array 8 share common row control lines $21_h$ for receiving control signals from the row driver 29. Pixels 2 that are in a same column of the pixel array 8 may share a common column readout line to provide output. For example, pixels 2 in a first column of the pixel array 8 share a column readout line $22_1$, pixels 2 in a second column of the pixel array 8 share a column readout line $22_2$, and pixels 2 in an m column of the pixel array 8 share a column readout line $22_m$. The row driver 29 typically controls the pixels 2 to provide output row by row.

Further examples of related art image sensors are disclosed in the following references: (i) U.S. Pat. No. 6,870,565 entitled "Semiconductor Imaging Sensor Array Devices with Dual-Port Digital Readout", the entire contents of which are incorporated by reference herein; (ii) U.S. Patent App. Pub. No. 2003/0043089 entitled "Doubling of Speed in CMOS Sensor with Column-Parallel ADCs", the entire contents of which are incorporated by reference herein; and (iii) A. Krymski et al., "A High Speed, 500 Frames/s, 1024×1024 CMOS Active Pixel Sensor", 1999 *Symposium on VLSI Circuits Digest of Technical Papers,* 1999, Kyoto, Japan, pp. 137-138, the entire contents of which are incorporated by reference herein.

FIG. 2A illustrates an example design of the pixel 2. The pixel 2 in FIG. 2A is typically called a four transistor (4T) pixel. The pixel 2 includes a photodiode 11, a transfer transistor 112, a sense node 13, a reset transistor 114, a source follower transistor 116, and a row select transistor 118. The transfer transistor 112, the reset transistor 114, the source follower transistor 116, and the row select transistor 118 may each comprise, for example, an n-channel metal-oxide semiconductor field effect transistor (NMOS transistor), or the like.

The pixel 2 illustrated in FIG. 2A is provided as an example of a pixel in an $i^{th}$ row and a $j^{th}$ column of a pixel array, such as the pixel array 8 (refer to FIG. 1), and the pixel 2 receives a transfer signal (tx) over a transfer signal line $21_{i1}$, a reset signal (rst) over a reset signal line $21_{i2}$, and a row select signal (rowsel) over a row select signal line $21_{i3}$. The transfer signal line $21_{i1}$, the reset signal line $21_{i2}$, and the row select signal line $21_{i3}$ are shared by all pixels in an $i^{th}$ row of a pixel array, such as the pixel array 8 (refer to FIG. 1), and the transfer signal (tx), the reset signal (rst), and the row select signal (rowsel) are provided from a row driver, such as the row driver 29 (refer to FIG. 1). The pixel 2 in FIG. 2A provides output to a column readout line $22_j$.

As illustrated in FIG. 2A, an anode of the photodiode 11 is connected to a fixed voltage, such as gound or another suitable voltage, and a cathode of the photodiode 11 is connected to a source of the transfer transistor 112. A gate 12 of the transfer transistor 112 is connected to the transfer signal line $21_{i1}$, and the gate 12 of the transfer transistor 112 may also be called the transfer gate 12. A drain of the transfer transistor 112 is connected to the sense node 13. A source of the reset transistor 114 is connected to the sense node 13, and a drain of the reset transistor 114 is connected to a supply voltage ($V_{dd}$) provided from a power supply (not shown). A gate 14 of the reset transistor 114 is connected to the reset signal line $21_{i2}$, and the gate 14 of the reset transistor 114 may also be called the reset gate 14.

A drain of the source follower transistor 116 is connected to the supply voltage ($V_{dd}$) provided from the power supply (not shown), and a source of the source follower transistor 116 is connected to a drain of the row select transistor 118. A gate 16 of the source follower transistor 116 is connected to the sense node 13, and the gate 16 of the source follower transistor 116 may also be called the source follower gate 16. A source 19 of the row select transistor 118 is connected to the column readout line $22_j$, and the source 19 of the row select transistor 118 may also be called the row select transistor source 19 or the pixel output area 19. The pixel output area 19 provides a pixel output (pout) signal to the column readout line $22_j$. A gate 18 of the row select transistor 118 is connected to the row select signal line $21_{i3}$, and the gate 18 of the row select transistor 118 may also be called the row select gate 18.

FIG. 2B illustrates a top-down view of an example layout of the pixel 2 of FIG. 2A. With reference to FIGS. 2A and 2B, a portion of a diffusion for the photodiode 11 may extend to serve as the source of the transfer transistor 112. Also, the sense node 13 may include a common diffusion that serves as the drain of the transfer transistor 112 and as the source of the reset transistor 114. The transfer gate 12 serves as a gate between the photodiode 11 and the sense node 13. A common diffusion 15 may serve as the drain 15 of the reset transistor 114 and also as the drain 15 of the source follower transistor 116. The reset gate 14 serves as a gate between the common diffusion 15 and the sense node 13. A common diffusion 17 may serve as the source 17 of the source follower transistor 116 and also as the drain 17 of the row select transistor 118. The source follower gate 16 serves as a gate between the common diffusion 15 and the common diffusion 17. The common diffusion 15, which serves as the drain 15 of the source follower transistor 116, is connected to the supply voltage ($V_{dd}$) provided from the power supply (not shown). The row select gate 18 serves as a gate between the common diffusion 17 and the pixel output area 19. FIG. 2C illustrates a top-down view of a portion 4 of a pixel array, such as the pixel array 8 (refer to FIG. 1). With reference to FIGS. 1 and 2C, the portion 4 of the pixel array 8 includes two pixels 2 that are adjacent to each other in a row of the pixel array 8.

Two types of shutter functions that are commonly employed in image sensors are (i) a global shutter operation; and (ii) a rolling shutter operation. In a typical global shutter operation, all pixels in a pixel array are reset, and then exposure is started simultaneously in all of the pixels in the pixel array, and then exposure is ended simultaneously in all of the pixels in the pixel array. In the typical global shutter operation, the charges stored in the pixels of the pixel array after exposure has ended are then read out row-by-row from the pixel array. In a typical rolling shutter operation, exposure starts at a same time for all pixels in a same row of the pixel array and ends at a same time for all pixels in a same row of the pixel array, but a time at which exposure starts is staggered for different rows in the pixel array. Rolling shutter operations have some disadvantages when capturing images of moving objects, because exposure starts in different rows at different times. Global shutters are better suited for capturing images of moving objects since exposure starts in all pixels at a same time, but global shutters may lead to problems in traditional 4T pixels in that stored charges in pixels may be compromised while waiting for readout, as will now be discussed in more detail.

An operation of the pixel 2 in FIG. 2A during a global shutter operation may proceed as follows: (i) a row driver, such as the row driver 29 (refer to FIG. 1) provides a HIGH signal on the reset signal line $21_{i2}$ and a HIGH signal on the transfer signal line $21_{i1}$ to discharge the photodiode 11 and reset the sense node 13; (ii) the row driver provides a LOW signal on the reset signal line $21_{i2}$ and a LOW signal on the transfer signal line $21_{i1}$ to close the reset gate 14 and the transfer gate 12 for an exposure time during which the photodiode 11 accumulates charge from sensed light; (iii) the row driver provides a HIGH signal on the transfer signal line $21_{i1}$ to open the transfer gate 12 to transfer the accumulated charge from the photodiode 11 to the sense node 13; (iv) the row driver provides a LOW signal on the transfer signal line $21_{i1}$ to close the transfer gate 12 to hold the charge at the sense node 13 waiting for a readout of charge from the row in which the pixel 2 is located; and (v) when charge from the row in which the pixel 2 is located is to be read out, the row driver provides a HIGH signal on the row select signal line $21_{i3}$ to open the row select gate 18 to provide output to the column readout line $22_j$.

Thus, in a global shutter operation, charge transferred to the sense node 13 of the pixel 2 is held waiting for readout as the readout proceeds from row to row. This may work in the case of a full-frame shutter for a global shutter operation when the shutter is open from one transfer to another. However, short shutters for global shutter operations might not be practical, because after the charge transfer to the sense node 13 is completed and the transfer gate 12 is closed, the photodiode 11 continues to accumulate photocharge and can get easily overfilled, which would cause excessive charges to leak from the photodiode 11 to the sense node 13 over the closed transfer gate 12 and compromise the useful charge that had been shuttered to the sense node 13 and that was waiting for readout.

One way that has been developed to deal with the problem of excess charge from a photodiode leaking over a closed transfer gate to a sense node is to add an additional transistor to the traditional 4T pixel of FIG. 2A to create a traditional five transistor (5T) pixel, where the additional transistor is used as an antiblooming transistor for draining excess charge from a photodiode. FIG. 3 illustrates a layout of a conventional 5T pixel 55. The pixel 55 is similar to the pixel 2 (refer to FIG. 2A), except that the drain of the reset transistor 114 is connected to a reset supply voltage $V_{rst}$ rather than to $V_{dd}$, and an antiblooming transistor 60 is added between the cathode of the photodiode 11 and the reset supply voltage $V_{rst}$. A gate of the antiblooming transistor 60 is connected to a control signal (sh). In the pixel 55, when charge has been transferred to the sense node 13 and the charge in the sense node 13 is waiting for readout, a HIGH signal may be provided to the antiblooming transistor 60 to drain excess charge from the photodiode 11 through the antiblooming transistor 60. In some instances, the control signal (sh) may be LOW only for the exposure time during which the photodiode 11 accumulates charge from sensed light and for the transfer time. The conventional 5T pixel 55 of FIG. 3 has disadvantages with respect to the conventional 4T pixel 2 of FIG. 2A in that the 5T pixel 55 is more difficult to lay out in a small size due to the additional transistor that is needed and due to two more lines that are required for control and bias.

Another issue of concern to image sensor designers is a maximum frame rate of an image sensor. The trend in image sensors is to have image sensors with more pixels, higher frame rates, and tighter design rules. With reference to FIG. 1, a signal delay for a signal to propagate from the row driver 29 across control lines, such as the control lines $21_1$, to all of the pixels in a row may be dominated by resistive-capacitive effects of the control lines. Due to the trends in image sensors, control lines such as the control lines $21_1$ are becoming longer, thinner, and need to operate faster. As an example of resistance and capacitance figures for a control line, a 20 mm long control line made in the first aluminum of 0.2 μm width and having resistivity of 120 mOhm/square, has resistance of 12 kOhm and an approximate capacitance of 2 pF. Thus, the characteristic control delay time of such a control line would be approximately 12 kOhm*2 pF, which is 24 ns. Such a delay time could set a limit on an achievable frame rate for an image sensor.

SUMMARY OF THE DISCLOSURE

An image sensor in accordance with an embodiment of the present invention includes a pixel array. In various embodiments, the pixel array comprises a pixel that includes a photodiode and a transfer gate, and in various embodiments the pixel array further comprises an antiblooming channel extending from the photodiode to either (i) a pixel output area, or (ii) a drain of a source follower transistor. In various embodiments, the antiblooming channel has a full depletion potential that is higher than a threshold leakage voltage of the transfer gate, and the antiblooming channel allows for charge above a certain level in the photodiode to flow out of the photodiode when the transfer gate is closed.

In some embodiments, the antiblooming channel includes a buried n type implant. Also, in some embodiments, the photodiode includes a buried n type implant with a same dose as a dose of the buried n type implant of the antiblooming channel. In some embodiments, the antiblooming channel has a width that is sufficiently narrower than a width of the photodiode such that a full depletion potential of the antiblooming channel is less than a full depletion potential of the photodiode. In various embodiments, the antiblooming channel includes a buried n type implant with a dose less than a dose of a buried n type implant of the photodiode.

In some embodiments, the antiblooming channel extends from the photodiode to the pixel output area. Also, in some embodiments, the pixel includes the pixel output area, and the pixel output area is connected to a column readout line. In some embodiments, the pixel output area is part of another pixel that is adjacent to the pixel. In various embodiments, the antiblooming channel extends from the photodiode to the drain of the source follower transistor. Also, in various embodiments, the pixel includes the source follower transistor. In various embodiments, the source follower transistor is part of another pixel that is adjacent to the pixel.

A method of manufacturing a pixel array in accordance with an embodiment of the present invention includes forming a pixel that includes a photodiode and a transfer gate, and forming an antiblooming channel that extends from the photodiode to either (i) a pixel output area, or (ii) a drain of a source follower transistor. In various embodiments, the forming of the antiblooming channel includes forming the antiblooming channel to have a full depletion potential that is higher than a threshold leakage voltage of the transfer gate. In some embodiments, the forming of the antiblooming channel includes depositing an n type implant, and the forming of the antiblooming channel occurs concurrently with at least a portion of the forming of the pixel.

In various embodiments, the forming of the antiblooming channel includes forming the antiblooming channel to have a same dose for an n type implant of the antiblooming channel as a dose of an n type implant of the photodiode, and forming the antiblooming channel with a width that is sufficiently narrower than a width of the photodiode such that a full depletion potential of the antiblooming channel is less than a full depletion potential of the photodiode. In some embodiments, the forming of the antiblooming channel includes forming the antiblooming channel to have a dose for an n type implant that is less than a dose of an n type implant of the photodiode.

In various embodiments, the forming of the antiblooming channel includes forming the antiblooming channel to extend from the photodiode to the pixel output area, and the method further includes connecting the pixel output area to a column readout line. In various embodiments, the forming of the antiblooming channel includes forming the antiblooming channel to extend from the photodiode to the drain of the source follower transistor.

An image sensor in accordance with an embodiment of the present invention includes a pixel array having a plurality of pixels. In various embodiments, the pixel array includes an antiblooming channel from a photodiode of a pixel of the plurality of pixels to a drain of a source follower transistor of another pixel of the plurality of pixels. In some embodiments, the antiblooming channel comprises a buried n type implant. Also, in some embodiments, the pixel and the other pixel are adjacent to each other in the pixel array.

In various embodiments, the antiblooming channel comprises a buried n type implant with a dose less than a dose of a buried n type implant of the photodiode. In some embodiments, the photodiode comprises a buried n type implant with a same dose as a dose of a buried n type implant of the antiblooming channel and the antiblooming channel has a width that is sufficiently narrower than a width of the photodiode such that a full depletion potential of the antiblooming channel is less than a full depletion potential of the photodiode.

In various embodiments, the antiblooming channel comprises a buried n type implant with approximately a minimum dose that causes the antiblooming channel to have a higher full depletion potential than a threshold leakage voltage of a transfer gate of the pixel. Also, in various embodiments, the antiblooming channel is formed such that the antiblooming channel allows for excess charge from the photodiode of the pixel to be removed to the drain of the source follower transistor of the other pixel rather than to leak over a closed transfer gate of the pixel.

The plurality of pixels may be arranged in a plurality of rows and a plurality of columns. In some embodiments, the image sensor further includes a first row driver and a second row driver, where the first row driver is connected to one or more pixels in a row of the plurality of rows by one or more control lines, and where the second row driver is connected to the one or more pixels in the row by the one or more control lines. Also, in some embodiments, the second row driver is located on an opposite side of the pixel array from the first row driver.

A method of manufacturing an image sensor in accordance with an embodiment of the present invention includes forming a photodiode of a pixel, and forming an antiblooming channel that extends from the photodiode of the pixel to a drain of a source follower transistor of another pixel, such as an adjacent pixel. In various embodiments, the forming of the antiblooming channel includes depositing an n type implant. Also, in various embodiments, the forming of the antiblooming channel occurs concurrently with at least a portion of the forming of the photodiode. In some embodiments, the forming of the antiblooming channel comprises forming the antiblooming channel to have a dose for an n type implant that is less than a dose of an n type implant of the photodiode.

In various embodiments, the forming of the antiblooming channel comprises forming the antiblooming channel to have a same dose for an n type implant of the antiblooming channel as a dose of an n type implant of the photodiode, and forming the antiblooming channel with a width that is sufficiently narrower than a width of the photodiode such that a full depletion potential of the antiblooming channel is less than a full depletion potential of the photodiode.

In some embodiments, the method further includes connecting the pixel to a control line, forming a first row driver and a second row driver, and connecting the first row driver and the second row driver to the control line. Also, in some embodiments, the forming of the first row driver and the second row driver comprises forming the second row driver on an opposite side of the pixel from the first row driver.

An image sensor in accordance with an embodiment of the present invention includes a pixel array, a first row driver, and a second row driver. The pixel array includes a plurality of pixels arranged in a plurality of rows and a plurality of columns. In various embodiments, the first row driver is connected to one or more pixels in a row of the plurality of rows by one or more control lines and the second row driver is also connected to the one or more pixels in the row by the one or more control lines. In some embodiments, the second row driver is located on an opposite side of the pixel array from the first row driver.

In various embodiments, the second row driver is controllable to provide a same one or more control signals on the one or more control lines as are provided by the first row driver on the one or more control lines. In some embodiments, the image sensor further includes at least two memory blocks connected to two memory controllers by a same control line.

In various embodiments, the image sensor further includes a first controller for controlling the first row driver, a second controller for controlling the second row driver, and a clock tree for distributing a clock signal from an input pad to the first controller and the second controller approximately simultaneously. In some embodiments, the image sensor further includes a first controller for controlling the first row driver, a second controller for controlling the second row driver, and a control signal tree for distributing a control signal from a control input pad to the first controller and the second controller approximately simultaneously.

A method in an image sensor in accordance with an embodiment of the present invention includes driving from a first row driver one or more control signals over one or more control lines to one or more pixels, and driving from a second row driver the one or more control signals over the one or more control lines to the one or more pixels. In various embodiments, the driving from the second row driver occurs concurrently with the driving from the first row driver. Also, in various embodiments, the second row driver drives the one or more control signals over the one or more control lines from an opposite direction as a direction in which the first row driver drives the one or more control signals over the one or more control lines. In some embodiments, the method further includes removing excess charge from a photodiode of a pixel of the one or more pixels through an antiblooming channel to a drain of a source follower transistor of another pixel of the one or more pixels when a transfer gate of the pixel is closed.

In various embodiments, an antiblooming path or channel is formed from a photodiode of a pixel to a nearby drain, such as a diffusion connected to a supply voltage ($V_{dd}$). In some embodiments, an active (thin oxide) area is extended from a photodiode of a pixel to a diffusion area of a neighboring or adjacent pixel that is connected to a supply voltage from a power supply. When implanted properly, such an active area creates a horizontal antiblooming path or channel for excess photodiode carriers to be removed from the photodiode of the pixel to the power supply. In some embodiments, the photodiode of the pixel is a pinned photodiode having at least two distinctive implants, which are a surface p minus type implant that overlaps over the photodiode area and a buried n minus type implant that forms a buried photodiode node.

In some embodiments, the antiblooming channel is formed using a same surface p minus type implant as the p minus type implant of the photodiode, and also formed using a buried n minus type implant with a dose less than a dose of a buried channel n minus type implant of the photodiode. In various other embodiments, the antiblooming channel is formed using the same mask layers and the same implants as to form the photodiode, but the antiblooming channel is formed with a width that is sufficiently narrower than a width of the photodiode such that a narrow channel effect is used to create the antiblooming channel. In such embodiments with the antiblooming channel formed sufficiently narrow as compared to the typical photodiode width, side fringe effects do not allow the antiblooming channel to be depleted as much as the photodiode.

DETAILED DESCRIPTION OF PREFERRED EMBODIMENTS

Figure 1:
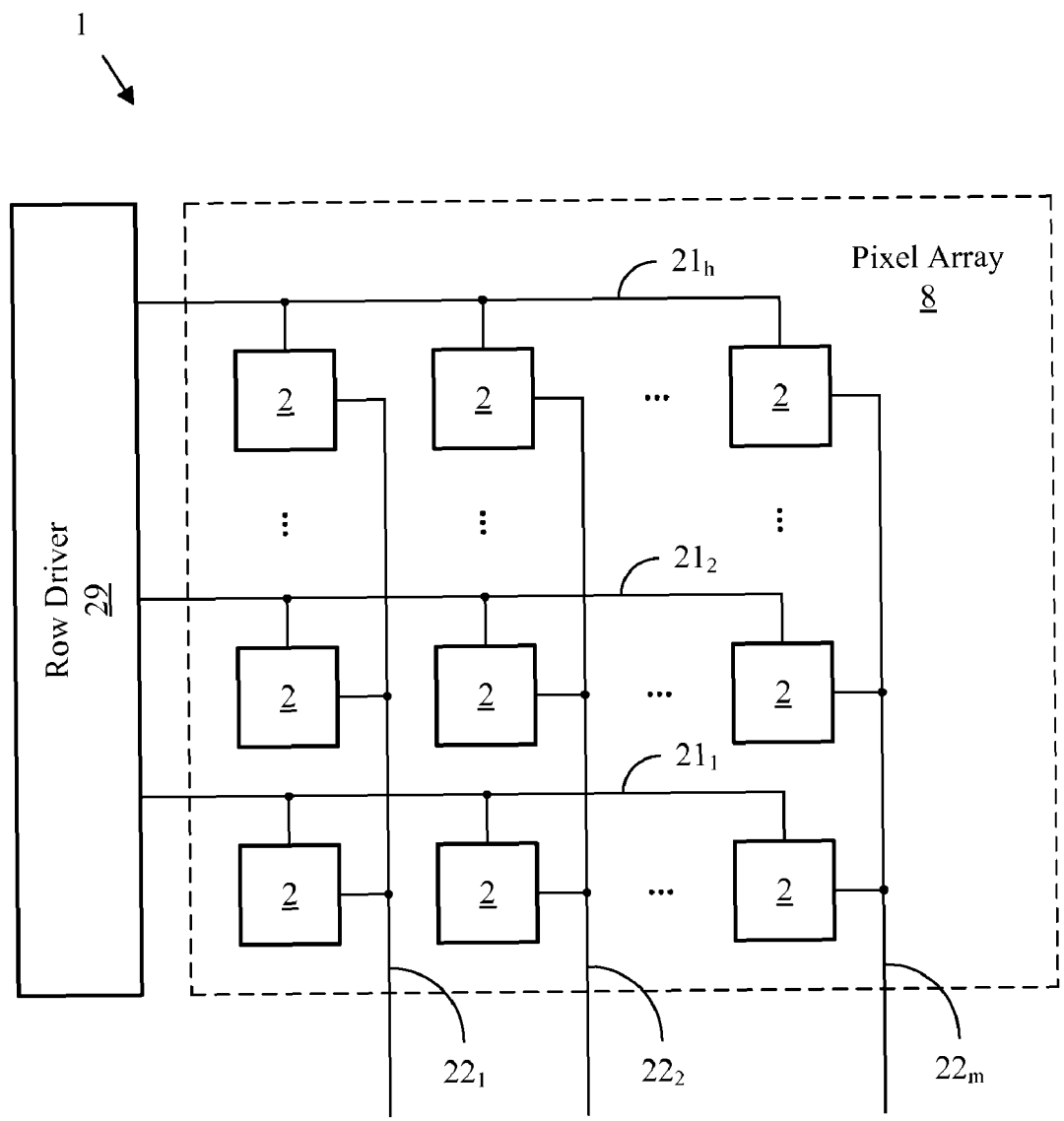
FIG. 1 illustrates an architecture of a related art image sensor.
Figure 2B:
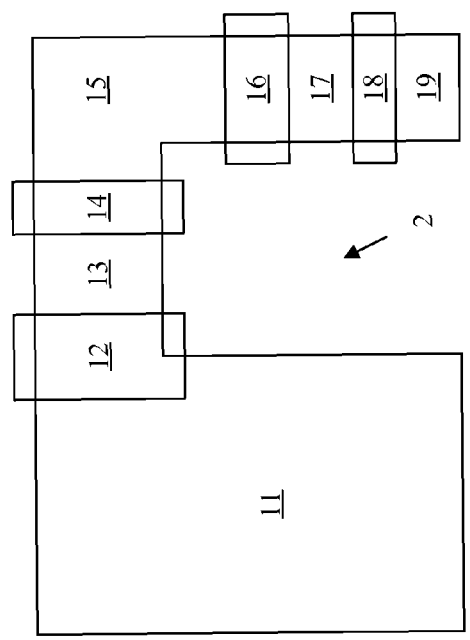
FIG. 2B illustrates a top-down view of an example layout of a pixel.
Figure 2A:
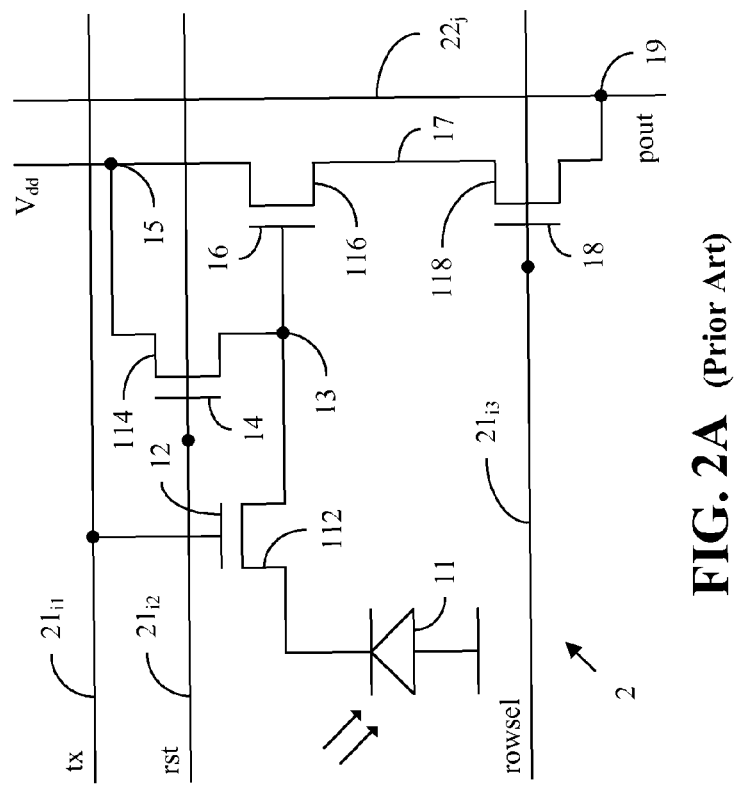
FIG. 2A illustrates an example design of a pixel.
Figure 2C:
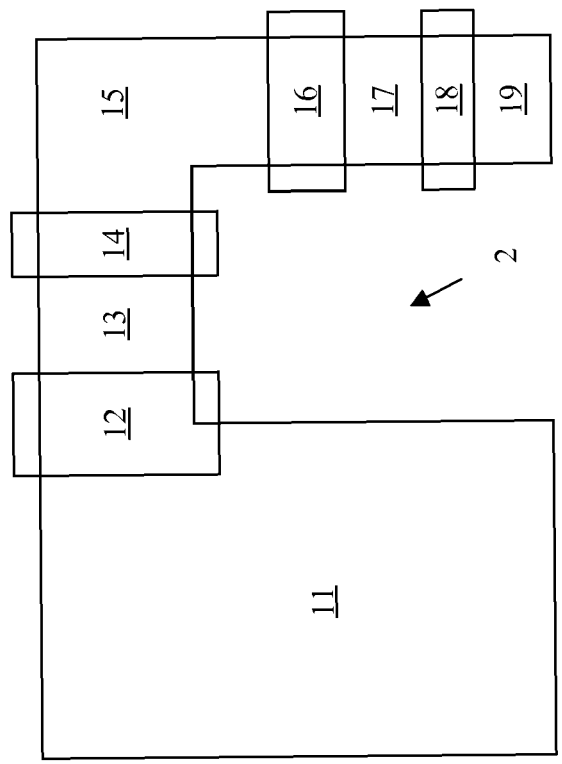
FIG. 2C illustrates a top-down view of a portion of a pixel array.
Figure 2C:
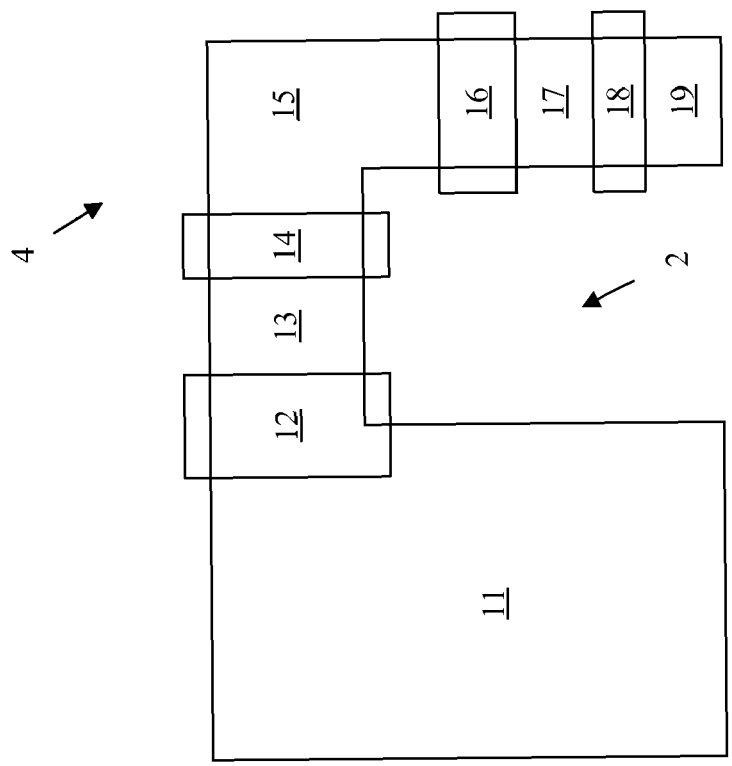
Figure 3:
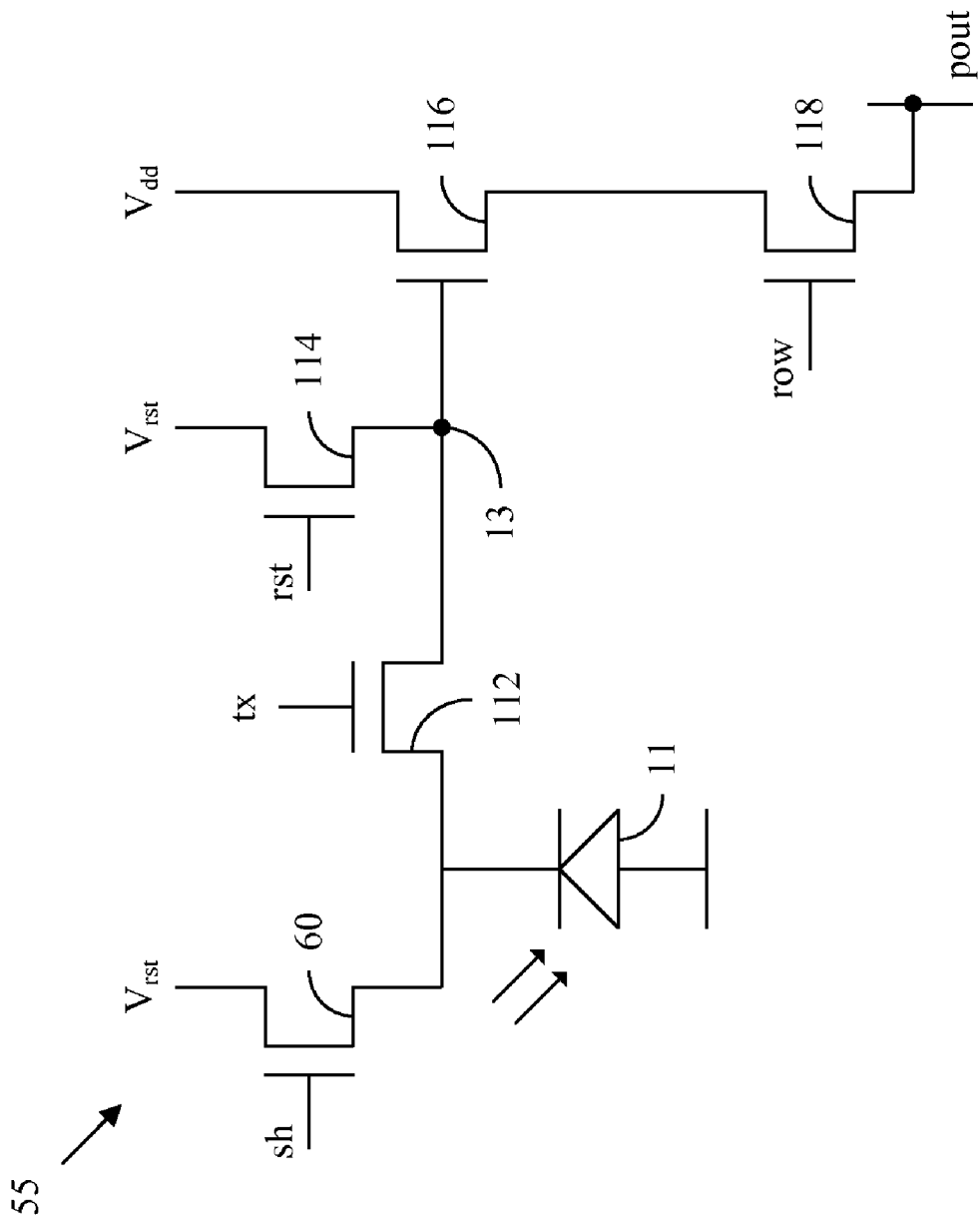
FIG. 3 illustrates an example design of a pixel.
Figure 4A:
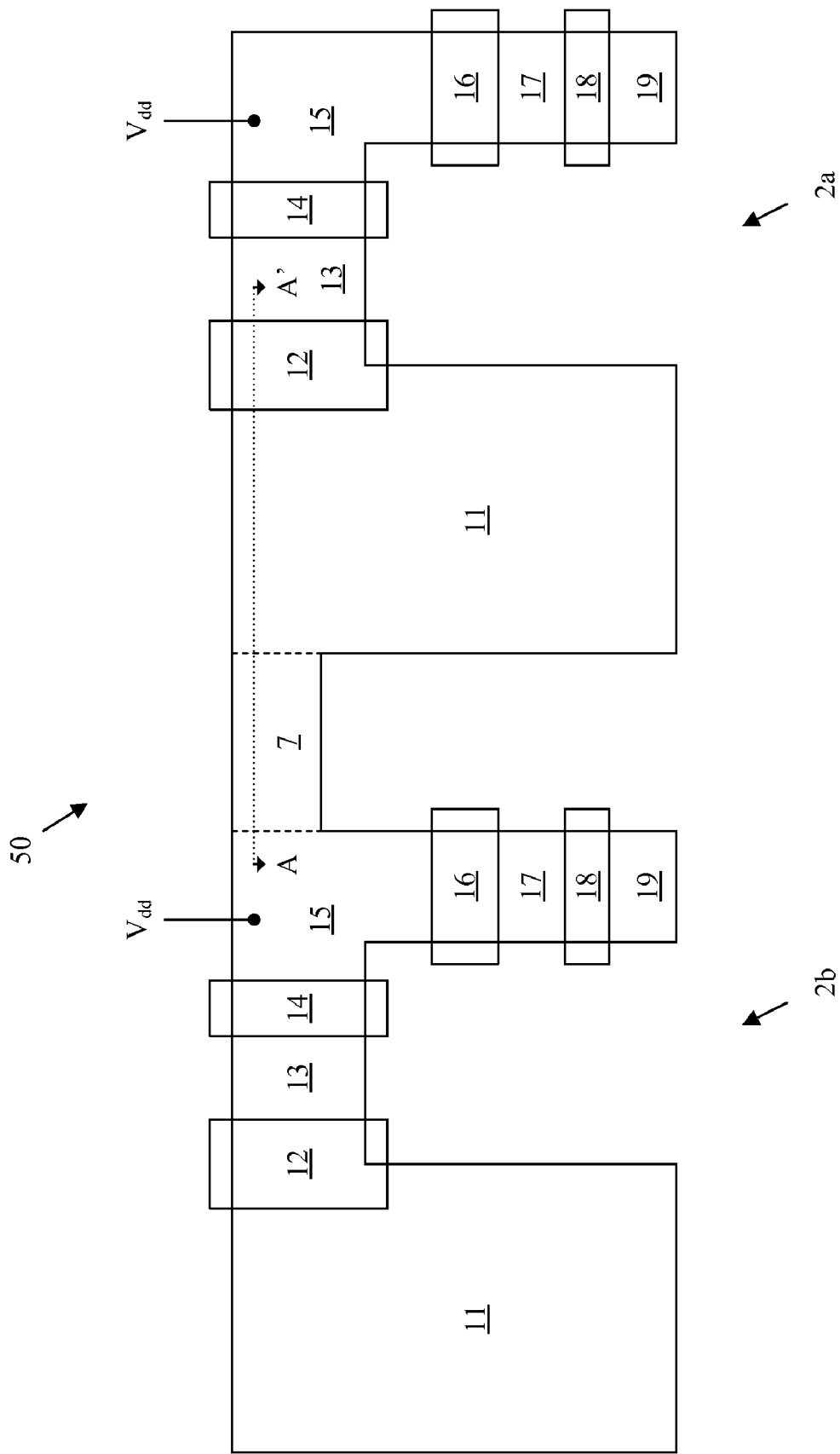
FIG. 4A illustrates a top-down view of a portion of a pixel array in accordance with an embodiment of the present invention.

FIG. 4A illustrates a top-down view of a portion of a pixel array 50 in accordance with an embodiment of the present invention. The portion of the pixel array 50 includes a pixel 2a, a pixel 2b, and an antiblooming path or antiblooming channel 7. The pixel 2a and the pixel 2b of FIG. 4A are of a same design as the pixel 2 of FIGS. 2A and 2B, and label numbers that are the same between the figures represent the same elements of the pixels. With reference to FIG. 4A, the pixel 2a and the pixel 2b each include a corresponding photodiode 11, transfer gate 12, sense node 13, reset gate 14, common diffusion 15, source follower gate 16, common diffusion 17, row select gate 18, and pixel output area 19. The common diffusion 15 of the pixel 2b serves as the drain 15 of the source follower transistor 116 (refer to FIG. 2A) of the pixel 2b. In various embodiments, the common diffusion 15 of the pixel 2b is connected to a supply voltage ($V_{dd}$) provided from a power supply (not shown).

In the embodiment illustrated in FIG. 4A, the antiblooming channel 7 extends horizontally from the photodiode 11 of the pixel 2a to the common diffusion 15 of the pixel 2b, where the common diffusion 15 of the pixel 2b serves as the drain 15 of the source follower transistor 116 (refer to FIG. 2A) of the pixel 2b and is connected to the supply voltage ($V_{dd}$). In various embodiments, the antiblooming channel 7 comprises an active (thin oxide) area that creates an antiblooming path for excess photodiode carriers to be drained from the photodiode 11 of the pixel 2a. In various embodiments, the antiblooming channel 7 is formed such that the antiblooming channel 7 allows for excess charge from the photodiode 11 of the pixel 2a to be removed to the common diffusion 15 of the pixel 2b rather than to leak over the transfer gate 12 of the pixel 2a when the transfer gate 12 of the pixel 2a is closed.

Figure 5A:
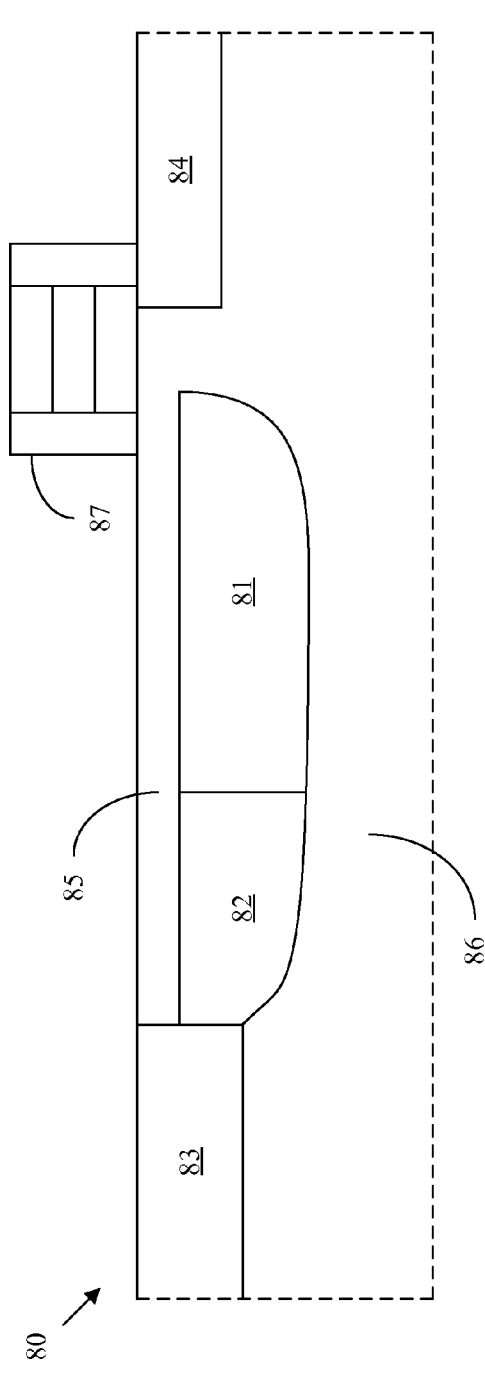
FIG. 5A illustrates a cross-sectional view of a section of a portion of a pixel array in accordance with an embodiment of the present invention.

FIG. 5A illustrates a cross-sectional view of a section 80 of the portion of the pixel array 50 of FIG. 4A taken along line A-A' in FIG. 4A. The section 80 includes a substrate 86, a buried n type implant 81, a buried n type implant 82, a drain diffusion 83, a sense node diffusion 84, a surface p type implant 85, and a transfer gate 87. In various embodiments, the substrate 86 comprises a p type substrate, or the like. With reference to FIGS. 4A and 5A, the common diffusion 15 of the pixel 2b comprises the drain diffusion 83, the antiblooming channel 7 comprises the buried n type implant 82 and a portion of the surface p type implant 85 that covers the buried n type implant 82, the photodiode 11 of the pixel 2a comprises the buried n type implant 81 and a portion of the surface p type implant 85 that covers the buried n type implant 81, the transfer gate 12 comprises the transfer gate 87, and the sense node 13 of the pixel 2a comprises the sense node diffusion 84. In various embodiments, n type implants comprise arsenic, phosphorous, antimony, or the like. Also, in various embodiments, p type implants comprise boron, or the like.

In various embodiments, the photodiode 11 of the pixel 2a is a pinned photodiode with at least two distinctive implants, such as the surface p type implant 85 that overlaps over an area of the photodiode 11 of the pixel 2a and the buried n type implant 81 that forms a buried photodiode node. In various embodiments, the surface p type implant 85 is a p minus type implant. Also, in various embodiments, the buried n type implant 81 is a buried n minus type implant. In some embodiments, the buried n type implant 82 of the antiblooming channel 7 is a buried n minus type implant.

In various embodiments, the buried n type implant 82 of the antiblooming channel 7 has a dose that is less than a dose of the buried n type implant 81 of the photodiode 11 of the pixel 2a. For example, in various embodiments the buried n type implant 82 of the antiblooming channel 7 is doped to a dopant concentration of approximately 1 $e^{12}$ atoms per $cm^3$ and the buried n type implant 81 of the photodiode 11 of the pixel 2a is doped to a dopant concentration of approximately 3.5 $e^{12}$ atoms per $cm^3$. It should be appreciated that the dopant concentration values provided in the immediately preceding example are merely provided as examples of dopant concentrations and that in various embodiments any suitable dopant concentrations can be used. In some embodiments, the buried n type implant 82 of the antiblooming channel 7 is formed concurrently with the forming of at least a portion of the buried n type implant 81 of the photodiode 11 of the pixel 2a. For example, in a case where a dose for the buried n type implant 82 is to be 1 $e^{12}$ atoms per $cm^3$ and a dose for the buried n type implant 81 is to be 3.5 $e^{12}$ atoms per $cm^3$, the buried n type implant 82 and the buried n type implant 81 can be doped at a same time to a dopant concentration of 1 $e^{12}$ atoms per $cm^3$ and then the buried n type implant 81 can be further doped with an additional dopant concentration of 2.5 $e^{12}$ atoms per $cm^3$ for a total dose of the buried n type implant 81 of 3.5 $e^{12}$ atoms per $cm^3$. Again, it should be noted that the dopant concentration values in the example are merely provided as examples of dopant concentrations and that in various embodiments any suitable dopant concentrations can be used.

In various other embodiments, the buried n type implant 82 of the antiblooming channel 7 has a dose that is a same dose as a dose of the buried n type implant 81 of the photodiode 11 of the pixel 2a, and in such embodiments, the antiblooming channel 7 may be formed to have a width that is sufficiently narrower than a width of the photodiode 11 of the pixel 2a such that a full depletion potential of the antiblooming channel 7 is less than a full depletion potential of the photodiode 11 of the pixel 2a. Such embodiments use the narrow channel effect to create the antiblooming channel 7, because the antiblooming channel 7 in such embodiments is formed narrow enough such that side fringe effects do not allow the antiblooming channel 7 to be depleted as much as the photodiode 11 of the pixel 2a.

Figure 5B:
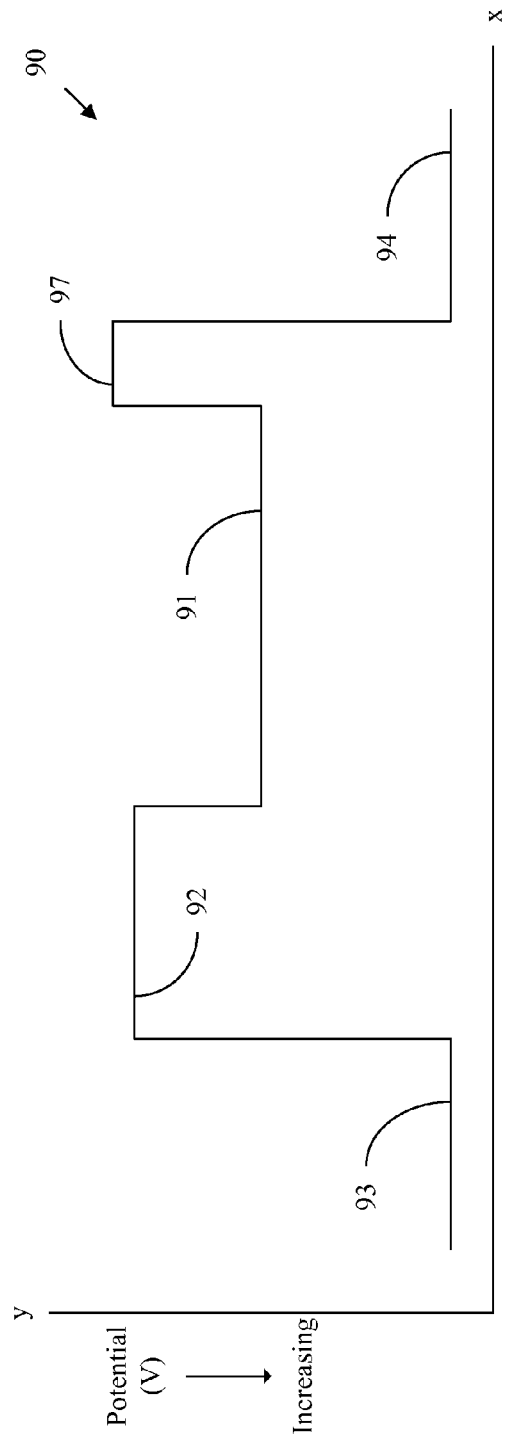
FIG. 5B illustrates a potential profile in accordance with an embodiment of the present invention.

FIG. 5B illustrates a potential profile 90 for the section 80 of FIG. 5A in accordance with an embodiment of the present invention. With reference to FIGS. 4A, 5A, and 5B, the potential profile 90 in FIG. 5B is shown as a graph with an x-axis that represents a position across the section 80 and a y-axis that represents a full depletion voltage or voltage potential in volts. It should be noted that potential in the potential profile 90 increases by moving down the y-axis, as is illustrated by the arrow next to the y-axis showing the direction of increasing potential. The potential profile 90 illustrates a full depletion potential 93 of the common diffusion 15 of the pixel 2b, a full depletion potential 92 of the antiblooming channel 7, a full depletion potential 91 of the photodiode 11 of the pixel 2a, a threshold leakage voltage 97 of the transfer gate 12 of the pixel 2a when the transfer gate 12 of the pixel 2a is closed, and a full depletion potential 94 of the sense node 13 of the pixel 2a. Each full depletion potential represents a maximum level of a potential in the corresponding area when the corresponding area is fully depleted.

In various embodiments, the antiblooming channel 7 is formed such that the full depletion potential 92 of the antiblooming channel 7 is less than the full depletion potential 91 of the photodiode 11 of the pixel 2a but more than the threshold leakage voltage 97 of the transfer gate 12 of the pixel 2a when the transfer gate 12 of the pixel 2a is closed. For example, in various embodiments, the threshold leakage voltage 97 may be approximately 0 V, the full depletion potential 92 may be in a range of 0.2 to 0.3 V, and the full depletion potential 91 may be approximately 1 V. It should be understood that the immediately preceding values are merely provided as an example of values, and that in various other embodiments different values may be realized for the threshold leakage voltage 97, the full depletion potential 92, and/or the full depletion potential 91.

According to the potential profile 90, when charge has been stored in the sense node 13 of the pixel 2a to await readout and the transfer gate 12 of the pixel 2a is closed, any excess charge generated in the photodiode 11 of the pixel 2a that would reduce the potential of the photodiode 11 of the pixel 2a below the full depletion potential 92 of the antiblooming channel 7 is removed through the antiblooming channel 7 to the common diffusion 15 of the pixel 2b and into the power supply (not shown) rather than leaking over the transfer gate 12 of the pixel 2a. Thus, excess charge from the photodiode 11 of the pixel 2a is removed to the common diffusion 15 of the pixel 2b through the antiblooming channel 7 rather than leaking over the transfer gate 12 of the pixel 2a when the transfer gate 12 of the pixel 2a is closed. This allows for short shutter times to be implemented during a frame vertical blanking time (between two neighboring readouts from an image sensor that includes the pixel 2a and the pixel 2b), since the charge stored in the sense node 13 of the pixel 2a and awaiting readout is not compromised by excess charge leaking across the transfer gate 12 of the pixel 2a when the transfer gate 12 of the pixel 2a is closed.

It should also be noted that, in various embodiments, a current caused by excess charge passing through the antiblooming channel 7 to the common diffusion 15 of the pixel 2b may be on the order of 6 to 7 times smaller than a current from the common diffusion 15 of the pixel 2b used for source following in the pixel 2b, so the small additional leakage current for the common diffusion 15 of the pixel 2b due to the antiblooming channel 7 would not adversely affect an operation of the pixel 2b. For example, in some embodiments, a current used for source following in the pixel 2b may be in a range of 1-10 µA, and an antiblooming current through the antiblooming channel 7 may be around 1 pA, so the antiblooming current would not disrupt the pixel operation.

Figure 5C:
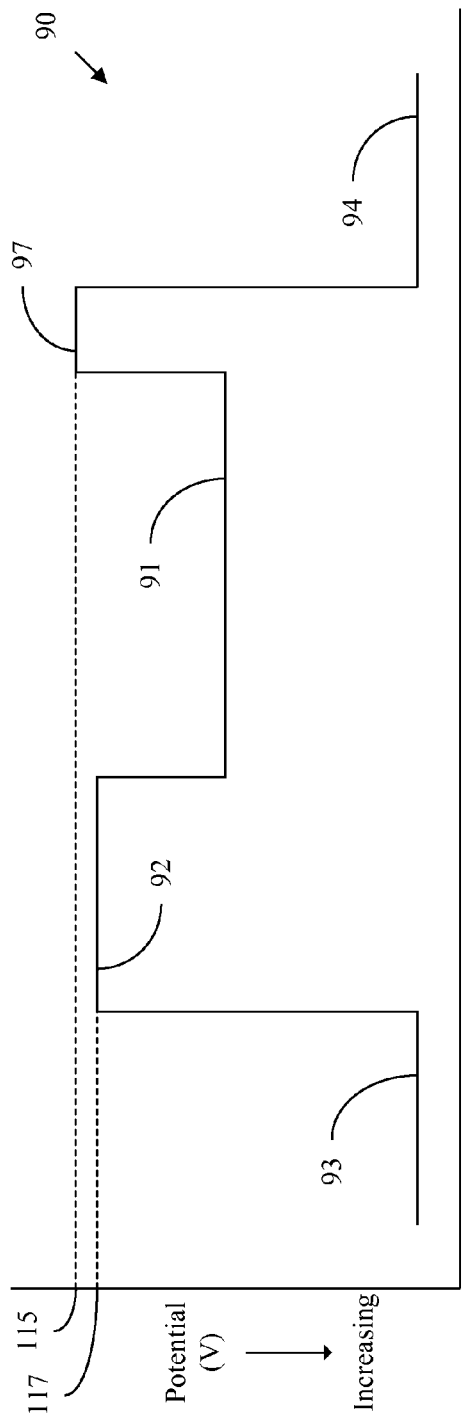
FIG. 5C illustrates a potential profile in accordance with an embodiment of the present invention.

FIG. 5C illustrates the potential profile 90 of FIG. 5B, and includes a reference label 115 showing a level of the threshold leakage voltage 97 and a reference label 117 showing a level of the full depletion potential 92. With reference to FIGS. 4A, 5A, and 5C, in various embodiments the buried n type implant 82 of the antiblooming channel 7 is formed with approximately a minimum dose that causes the antiblooming channel 7 to have a higher full depletion potential 92 than the threshold leakage voltage 97 of the transfer gate 12 of the pixel 2a. In various embodiments, in order to maximize an effective potential of the photodiode 11 of the pixel 2a while still having the antiblooming channel 7 to remove excess charge, the antiblooming channel 7 is formed to have a full depletion potential 92 that is as close as possible to the threshold leakage voltage 97 while still serving the purpose of removing excess charge from the photodiode 11 of the pixel 2a to the common diffusion 15 of the pixel 2b. In various embodiments, experiments and/or simulations may be performed to determine a dose and/or a size for the antiblooming channel that provides a desired full depletion potential 92.

Figure 5D:
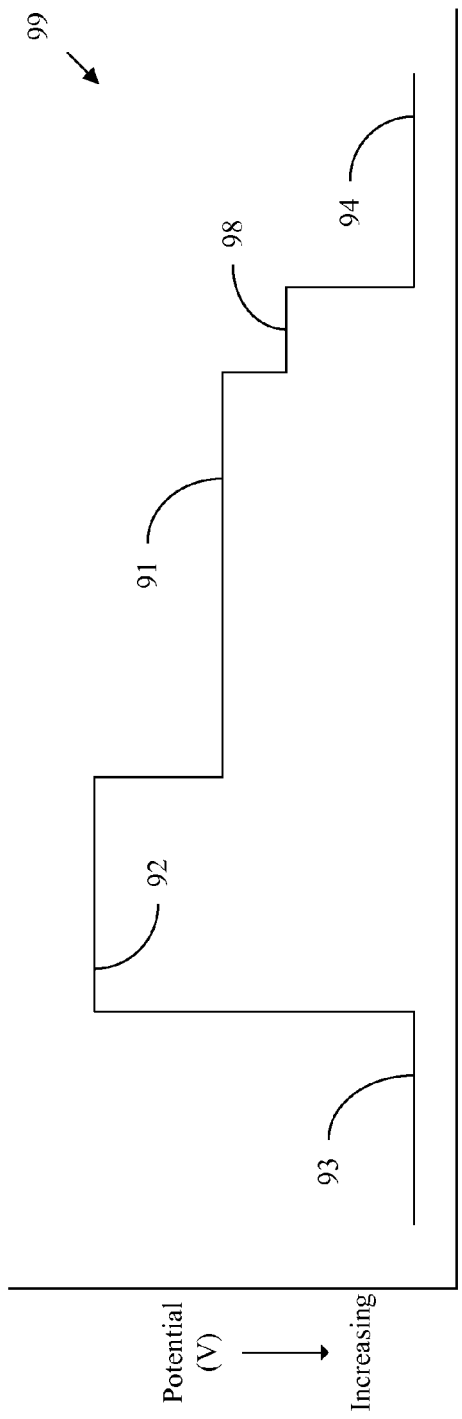
FIG. 5D illustrates a potential profile in accordance with an embodiment of the present invention.

FIG. 5D illustrates a potential profile 99 that is similar to the potential profile 90 of FIG. 5B, except that the potential profile 99 illustrates a state in which the transfer gate 12 of the pixel 2a is open rather than closed. With reference to FIGS. 4A, 5A, and 5D, in various embodiments, when the transfer gate 12 of the pixel 2a is open, a potential of a channel across the transfer gate 12 of the pixel 2a increases to a transfer gate potential 98, which is higher than the full depletion potential 91 of the photodiode 11 of the pixel 2a. Thus, in such embodiments, when the transfer gate 12 of the pixel 2a is open, charge is able to be transferred from the photodiode 11 of the pixel 2a to the sense node 13 of the pixel 2a.

Figure 6:
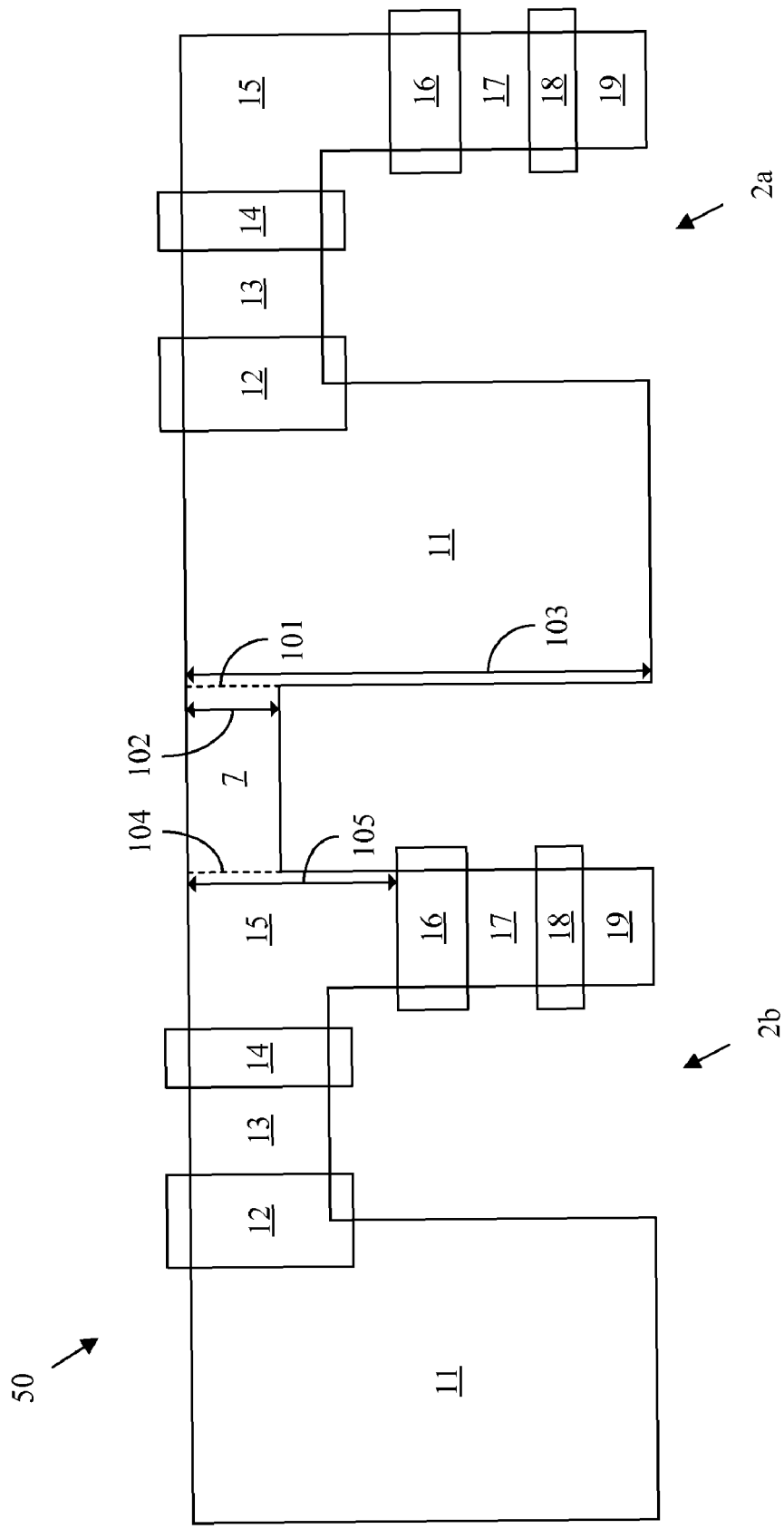
FIG. 6 illustrates a top-down view of a portion of a pixel array in accordance with an embodiment of the present invention.

FIG. 6 illustrates a top-down view of the portion of the pixel array 50 of FIG. 4A in accordance with an embodiment of the present invention, and FIG. 6 includes reference labels for showing widths of various elements in the figure. In the embodiment of FIG. 6, a common side 101 is shared between the antiblooming channel 7 and the photodiode 11 of the pixel 2a. Also, a common side 104 is shared between the antiblooming channel 7 and the common diffusion 15 of the pixel 2b. A width 103 of the photodiode 11 of the pixel 2a is illustrated by a double-sided arrow. A width 102 of the antiblooming channel 7 is illustrated by a double-sided arrow. Also, a width 105 of the common diffusion 15 of the pixel 2b is illustrated by a double-sided arrow. In various embodiments, the width 102 of the antiblooming channel 7 is formed to be sufficiently narrower than the width 103 of the photodiode 11 of the pixel 2a to create a narrow channel effect such that a full depletion potential of the antiblooming channel 7 is less than a full depletion potential of the photodiode 11 of the pixel 2a. In various embodiments, the width 102 of the antiblooming channel 7 is less than one-third of the width 103 of the photodiode 11 of the pixel 2a. For example, in some embodiments, the width 103 of the photodiode 11 of the pixel 2a may be approximately 3 microns while the width 102 of the antiblooming channel 7 may be approximately 0.5 microns. It should be noted that the width values in the example are merely provided as examples of widths and that in various embodiments any suitable widths can be used. In various embodiments, experiments and/or simulations may be performed to determine the width 102 that provides a desired full depletion potential for the antiblooming channel 7. In some embodiments, a narrow channel effect is used in combination with using two different dopant concentrations for n type implants for the antiblooming channel 7 and the photodiode 11 of the pixel 2a so as to achieve a desired full depletion potential for the antiblooming channel 7.

Figure 4B:
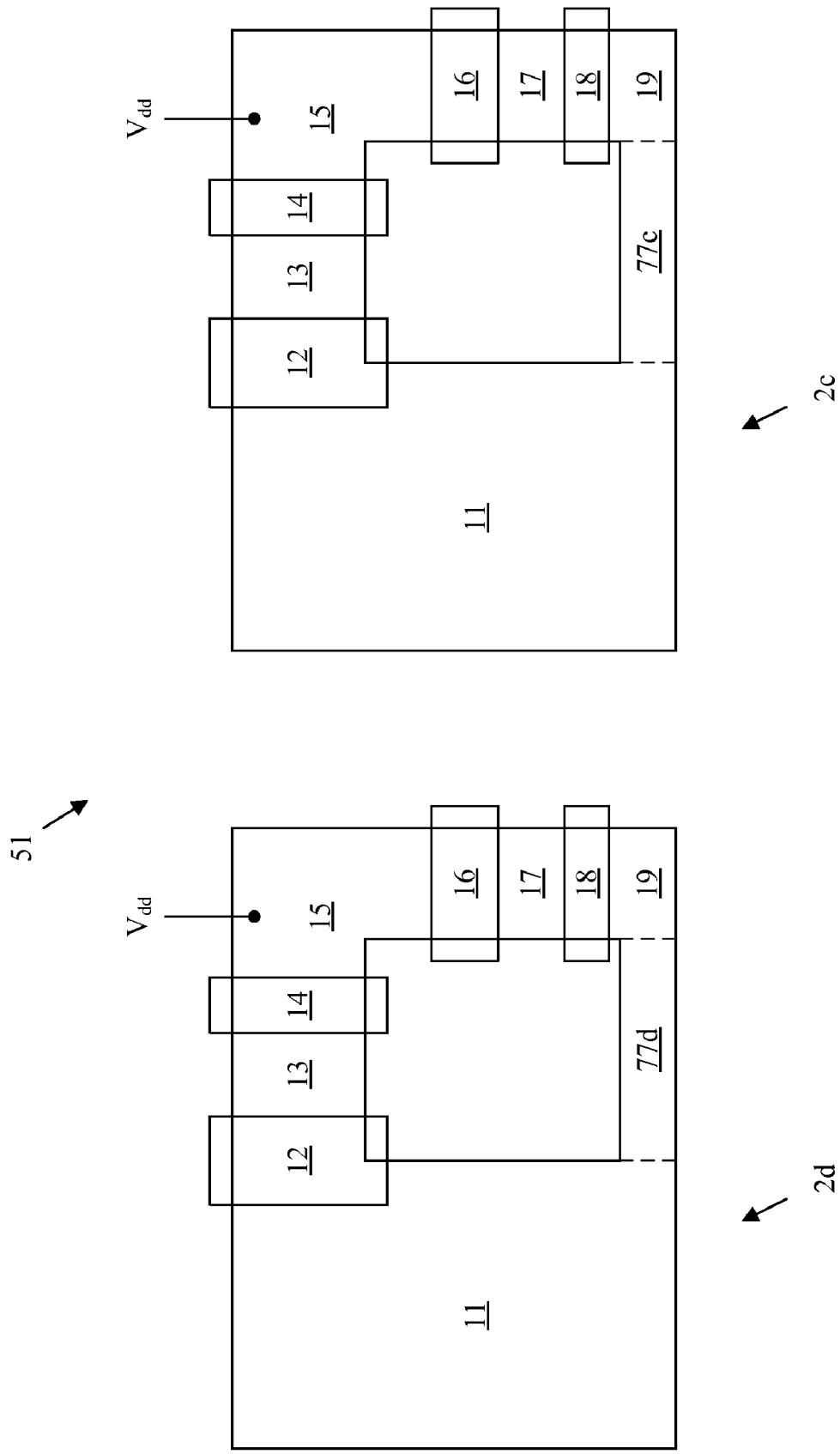
FIG. 4B illustrates a top-down view of a portion of a pixel array in accordance with an embodiment of the present invention.

FIG. 4B illustrates a top-down view of a portion of a pixel array 51 in accordance with an embodiment of the present invention. The portion of the pixel array 51 includes a pixel 2c, a pixel 2d, an antiblooming channel 77c, and an antiblooming channel 77d. With reference to FIG. 4B, the pixel 2c and the pixel 2d each include a corresponding photodiode 11, transfer gate 12, sense node 13, reset gate 14, common diffusion 15, source follower gate 16, common diffusion 17, row select gate 18, and pixel output area 19. The pixel output area 19 of the pixel 2c is connected to a corresponding column readout line (not shown in FIG. 4B) for providing output, and the pixel output area 19 of the pixel 2d is connected to a corresponding column readout line (not shown in FIG. 4B) for providing output.

In the embodiment illustrated in FIG. 4B, the antiblooming channel 77c extends horizontally from the photodiode 11 of the pixel 2c to the pixel output area 19 of the pixel 2c. Also, in the embodiment illustrated in FIG. 4B, the antiblooming channel 77d extends horizontally from the photodiode 11 of the pixel 2d to the pixel output area 19 of the pixel 2d. In various embodiments, the antiblooming channel 77c comprises an active (thin oxide) area that creates an antiblooming path for excess photodiode carriers to be drained from the photodiode 11 of the pixel 2c. Also, in various embodiments, the antiblooming channel 77d comprises an active (thin oxide) area that creates an antiblooming path for excess photodiode carriers to be drained from the photodiode 11 of the pixel 2d.

In various embodiments, the antiblooming channel 77c is formed such that the antiblooming channel 77c allows for excess charge from the photodiode 11 of the pixel 2c to be removed to the pixel output area 19 of the pixel 2c rather than to leak over the transfer gate 12 of the pixel 2c when the transfer gate 12 of the pixel 2c is closed. Also, in various embodiments, the antiblooming channel 77d is formed such that the antiblooming channel 77d allows for excess charge from the photodiode 11 of the pixel 2d to be removed to the pixel output area 19 of the pixel 2d rather than to leak over the transfer gate 12 of the pixel 2d when the transfer gate 12 of the pixel 2d is closed. In various embodiments, the antiblooming channel 77c has a full depletion potential that is higher than a threshold leakage voltage of the transfer gate 12 of the pixel 2c. Also, in various embodiments, the antiblooming channel 77d has a full depletion potential that is higher than a threshold leakage voltage of the transfer gate 12 of the pixel 2d.

In various embodiments, the antiblooming channel 77c allows for charge above a certain level in the photodiode 11 of the pixel 2c to flow out of the photodiode 11 of the pixel 2c when the transfer gate 12 of the pixel 2c is closed. In some embodiments, the antiblooming channel 77c includes a buried n type implant. Also, in some embodiments, the photodiode 11 of the pixel 2c includes a buried n type implant with a same dose as a dose of the buried n type implant of the antiblooming channel 77c. In some embodiments, the antiblooming channel 77c has a width that is sufficiently narrower than a width of the photodiode 11 of the pixel 2c such that a full depletion potential of the antiblooming channel 77c is less than a full depletion potential of the photodiode 11 of the pixel 2c. In various embodiments, the antiblooming channel 77c includes a buried n type implant with a dose less than a dose of a buried n type implant of the photodiode 11 of the pixel 2c.

In various embodiments, the antiblooming channel 77d allows for charge above a certain level in the photodiode 11 of the pixel 2d to flow out of the photodiode 11 of the pixel 2d when the transfer gate 12 of the pixel 2d is closed. In some embodiments, the antiblooming channel 77d includes a buried n type implant. Also, in some embodiments, the photodiode 11 of the pixel 2d includes a buried n type implant with a same dose as a dose of the buried n type implant of the antiblooming channel 77d. In some embodiments, the antiblooming channel 77d has a width that is sufficiently narrower than a width of the photodiode 11 of the pixel 2d such that a full depletion potential of the antiblooming channel 77d is less than a full depletion potential of the photodiode 11 of the pixel 2d. In various embodiments, the antiblooming channel 77d includes a buried n type implant with a dose less than a dose of a buried n type implant of the photodiode 11 of the pixel 2d.

Figure 4C:
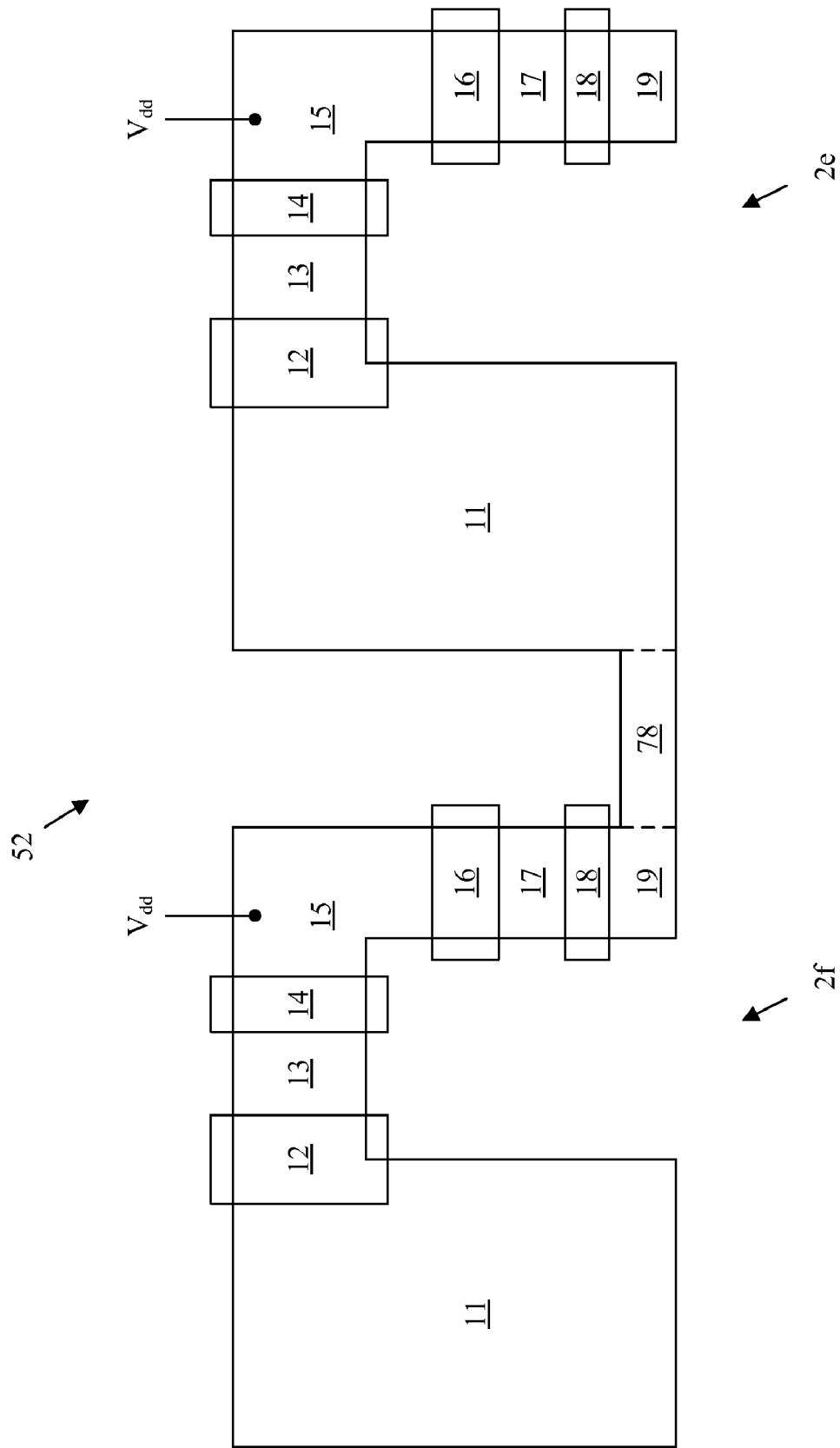
FIG. 4C illustrates a top-down view of a portion of a pixel array in accordance with an embodiment of the present invention.

FIG. 4C illustrates a top-down view of a portion of a pixel array 52 in accordance with an embodiment of the present invention. The portion of the pixel array 52 includes a pixel 2e, a pixel 2f, and an antiblooming channel 78. With reference to FIG. 4C, the pixel 2e and the pixel 2f each include a corresponding photodiode 11, transfer gate 12, sense node 13, reset gate 14, common diffusion 15, source follower gate 16, common diffusion 17, row select gate 18, and pixel output area 19. The pixel output area 19 of the pixel 2e is connected to a corresponding column readout line (not shown in FIG. 4C) for providing output, and the pixel output area 19 of the pixel 2f is connected to a corresponding column readout line (not shown in FIG. 4C) for providing output.

In the embodiment illustrated in FIG. 4C, the antiblooming channel 78 extends horizontally from the photodiode 11 of the pixel 2e to the pixel output area 19 of the pixel 2f. In various embodiments, the antiblooming channel 78 comprises an active (thin oxide) area that creates an antiblooming path for excess photodiode carriers to be drained from the photodiode 11 of the pixel 2e. In various embodiments, the antiblooming channel 78 is formed such that the antiblooming channel 78 allows for excess charge from the photodiode 11 of the pixel 2e to be removed to the pixel output area 19 of the pixel 2f rather than to leak over the transfer gate 12 of the pixel 2e when the transfer gate 12 of the pixel 2e is closed. In various embodiments, the antiblooming channel 78 has a full depletion potential that is higher than a threshold leakage voltage of the transfer gate 12 of the pixel 2e.

In various embodiments, the antiblooming channel 78 allows for charge above a certain level in the photodiode 11 of the pixel 2e to flow out of the photodiode 11 of the pixel 2e when the transfer gate 12 of the pixel 2e is closed. In some embodiments, the antiblooming channel 78 includes a buried n type implant. Also, in some embodiments, the photodiode 11 of the pixel 2e includes a buried n type implant with a same dose as a dose of the buried n type implant of the antiblooming channel 78. In some embodiments, the antiblooming channel 78 has a width that is sufficiently narrower than a width of the photodiode 11 of the pixel 2e such that a full depletion potential of the antiblooming channel 78 is less than a full depletion potential of the photodiode 11 of the pixel 2e. In various embodiments, the antiblooming channel 78 includes a buried n type implant with a dose less than a dose of a buried n type implant of the photodiode 11 of the pixel 2e.

Figure 4D:
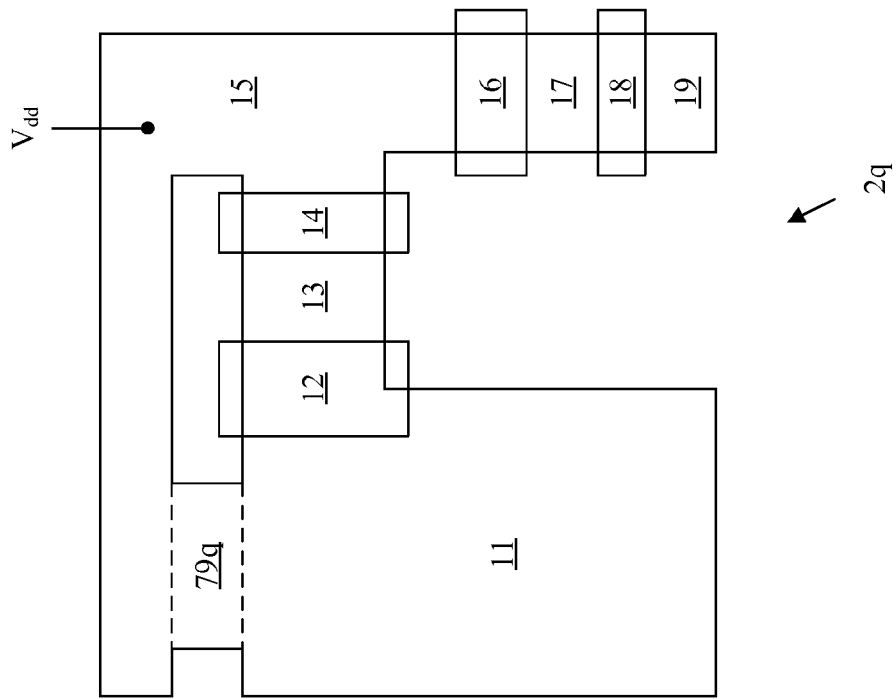
FIG. 4D illustrates a top-down view of a portion of a pixel array in accordance with an embodiment of the present invention.
Figure 4D:
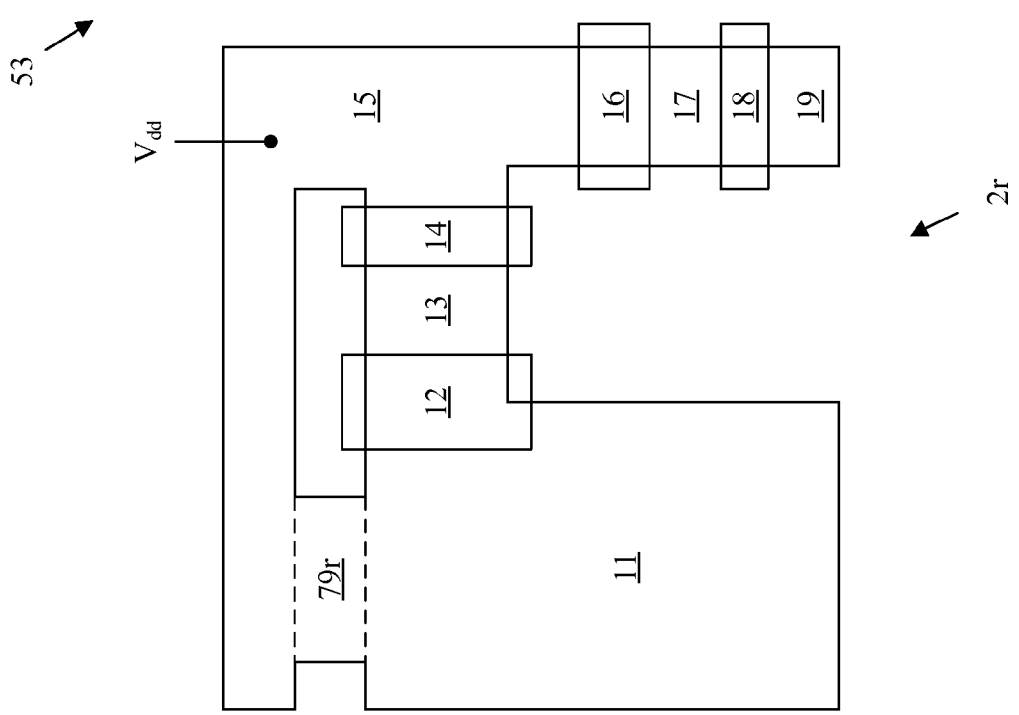

FIG. 4D illustrates a top-down view of a portion of a pixel array 53 in accordance with an embodiment of the present invention. The portion of the pixel array 53 includes a pixel 2q, a pixel 2r, an antiblooming channel 79q, and an antiblooming channel 79r. With reference to FIG. 4D, the pixel 2q and the pixel 2r each include a corresponding photodiode 11, transfer gate 12, sense node 13, reset gate 14, common diffusion 15, source follower gate 16, common diffusion 17, row select gate 18, and pixel output area 19. The common diffusion 15 of the pixel 2q serves as the drain 15 of the source follower transistor 116 (refer to FIG. 2A) of the pixel 2q. In various embodiments, the common diffusion 15 of the pixel 2q is connected to a supply voltage ($V_{dd}$) provided from a power supply (not shown). The common diffusion 15 of the pixel 2r serves as the drain 15 of the source follower transistor 116 (refer to FIG. 2A) of the pixel 2r. In various embodiments, the common diffusion 15 of the pixel 2r is connected to a supply voltage ($V_{dd}$) provided from a power supply (not shown).

In the embodiment illustrated in FIG. 4D, the antiblooming channel 79q extends vertically from the photodiode 11 of the pixel 2q to the common diffusion 15 of the pixel 2q. Also, in the embodiment illustrated in FIG. 4D, the antiblooming channel 79r extends vertically from the photodiode 11 of the pixel 2r to the common diffusion 15 of the pixel 2r. In various embodiments, the antiblooming channel 79q comprises an active (thin oxide) area that creates an antiblooming path for excess photodiode carriers to be drained from the photodiode 11 of the pixel 2q. Also, in various embodiments, the antiblooming channel 79r comprises an active (thin oxide) area that creates an antiblooming path for excess photodiode carriers to be drained from the photodiode 11 of the pixel 2r.

In various embodiments, the antiblooming channel 79q is formed such that the antiblooming channel 79q allows for excess charge from the photodiode 11 of the pixel 2q to be removed to the common diffusion 15 of the pixel 2q rather than to leak over the transfer gate 12 of the pixel 2q when the transfer gate 12 of the pixel 2q is closed. Also, in various embodiments, the antiblooming channel 79r is formed such that the antiblooming channel 79r allows for excess charge from the photodiode 11 of the pixel 2r to be removed to the common diffusion 15 of the pixel 2r rather than to leak over the transfer gate 12 of the pixel 2r when the transfer gate 12 of the pixel 2r is closed. In various embodiments, the antiblooming channel 79q has a full depletion potential that is higher than a threshold leakage voltage of the transfer gate 12 of the pixel 2q. Also, in various embodiments, the antiblooming channel 79r has a full depletion potential that is higher than a threshold leakage voltage of the transfer gate 12 of the pixel 2r.

In various embodiments, the antiblooming channel 79q allows for charge above a certain level in the photodiode 11 of the pixel 2q to flow out of the photodiode 11 of the pixel 2q when the transfer gate 12 of the pixel 2q is closed. In some embodiments, the antiblooming channel 79q includes a buried n type implant. Also, in some embodiments, the photodiode 11 of the pixel 2q includes a buried n type implant with a same dose as a dose of the buried n type implant of the antiblooming channel 79q. In some embodiments, the antiblooming channel 79q has a length that is sufficiently smaller than a length of the photodiode 11 of the pixel 2q such that a full depletion potential of the antiblooming channel 79q is less than a full depletion potential of the photodiode 11 of the pixel 2q. In various embodiments, the antiblooming channel 79q includes a buried n type implant with a dose less than a dose of a buried n type implant of the photodiode 11 of the pixel 2q.

In various embodiments, the antiblooming channel 79r allows for charge above a certain level in the photodiode 11 of the pixel 2r to flow out of the photodiode 11 of the pixel 2r when the transfer gate 12 of the pixel 2r is closed. In some embodiments, the antiblooming channel 79r includes a buried n type implant. Also, in some embodiments, the photodiode 11 of the pixel 2r includes a buried n type implant with a same dose as a dose of the buried n type implant of the antiblooming channel 79r. In some embodiments, the antiblooming channel 79r has a length that is sufficiently smaller than a length of the photodiode 11 of the pixel 2r such that a full depletion potential of the antiblooming channel 79r is less than a full depletion potential of the photodiode 11 of the pixel 2r. In various embodiments, the antiblooming channel 79r includes a buried n type implant with a dose less than a dose of a buried n type implant of the photodiode 11 of the pixel 2r.

Figure 4E:
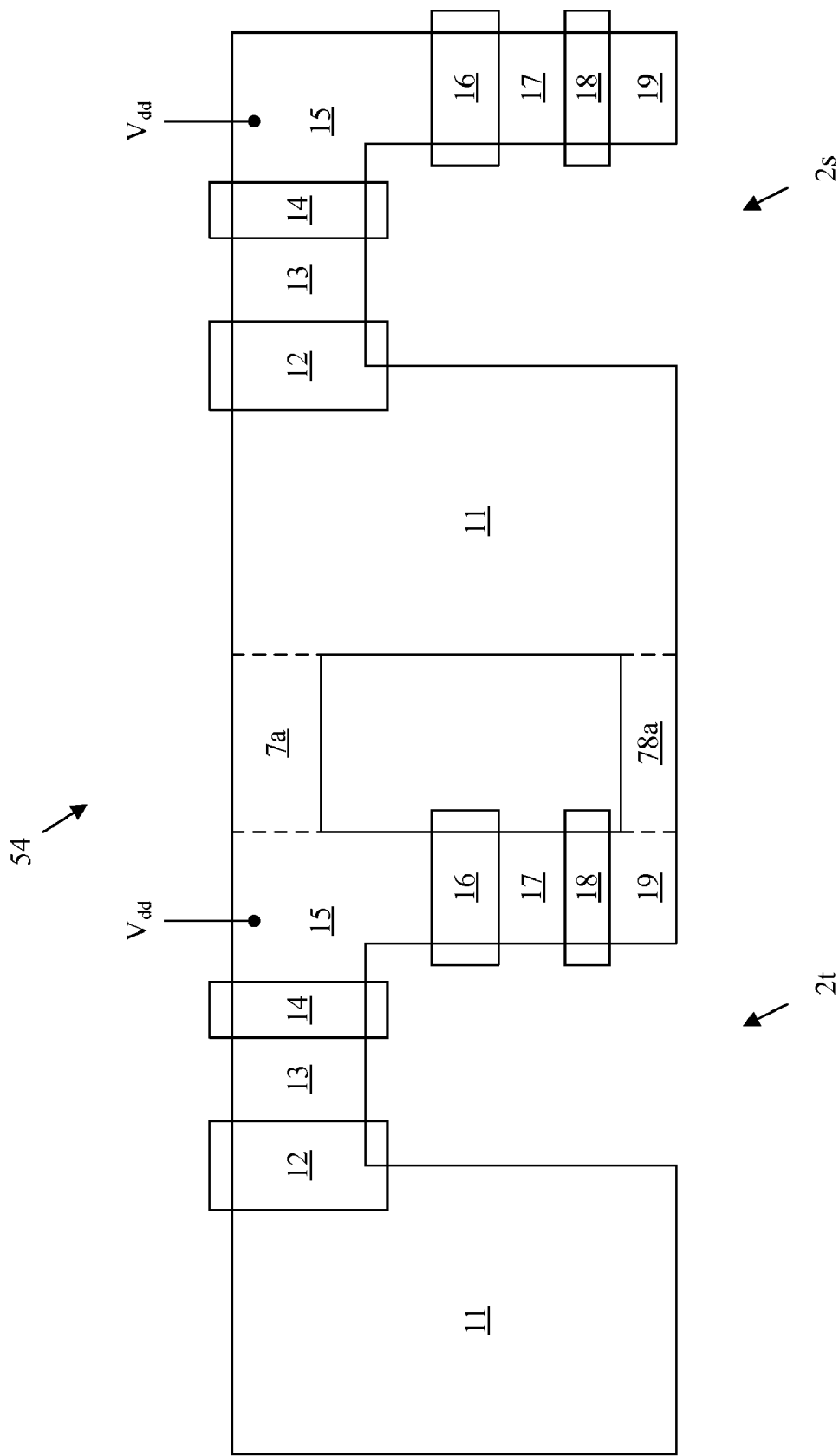
FIG. 4E illustrates a top-down view of a portion of a pixel array in accordance with an embodiment of the present invention.

FIG. 4E illustrates a top-down view of a portion of a pixel array 54 in accordance with an embodiment of the present invention. The portion of the pixel array 54 includes a pixel 2s, a pixel 2t, an antiblooming channel 7a, and an antiblooming channel 78a. With reference to FIG. 4E, the pixel 2s and the pixel 2t each include a corresponding photodiode 11, transfer gate 12, sense node 13, reset gate 14, common diffusion 15, source follower gate 16, common diffusion 17, row select gate 18, and pixel output area 19. The common diffusion 15 of the pixel 2t serves as the drain 15 of the source follower transistor 116 (refer to FIG. 2A) of the pixel 2t. In various embodiments, the common diffusion 15 of the pixel 2t is connected to a supply voltage ($V_{dd}$) provided from a power supply (not shown). The pixel output area 19 of the pixel 2t is connected to a corresponding column readout line (not shown in FIG. 4E) for providing output. In the embodiment illustrated in FIG. 4E, the antiblooming channel 7a extends horizontally from the photodiode 11 of the pixel 2s to the common diffusion 15 of the pixel 2t. Also, in the embodiment illustrated in FIG. 4E, the antiblooming channel 78a extends horizontally from the photodiode 11 of the pixel 2s to the pixel output area 19 of the pixel 2t.

Figure 7:
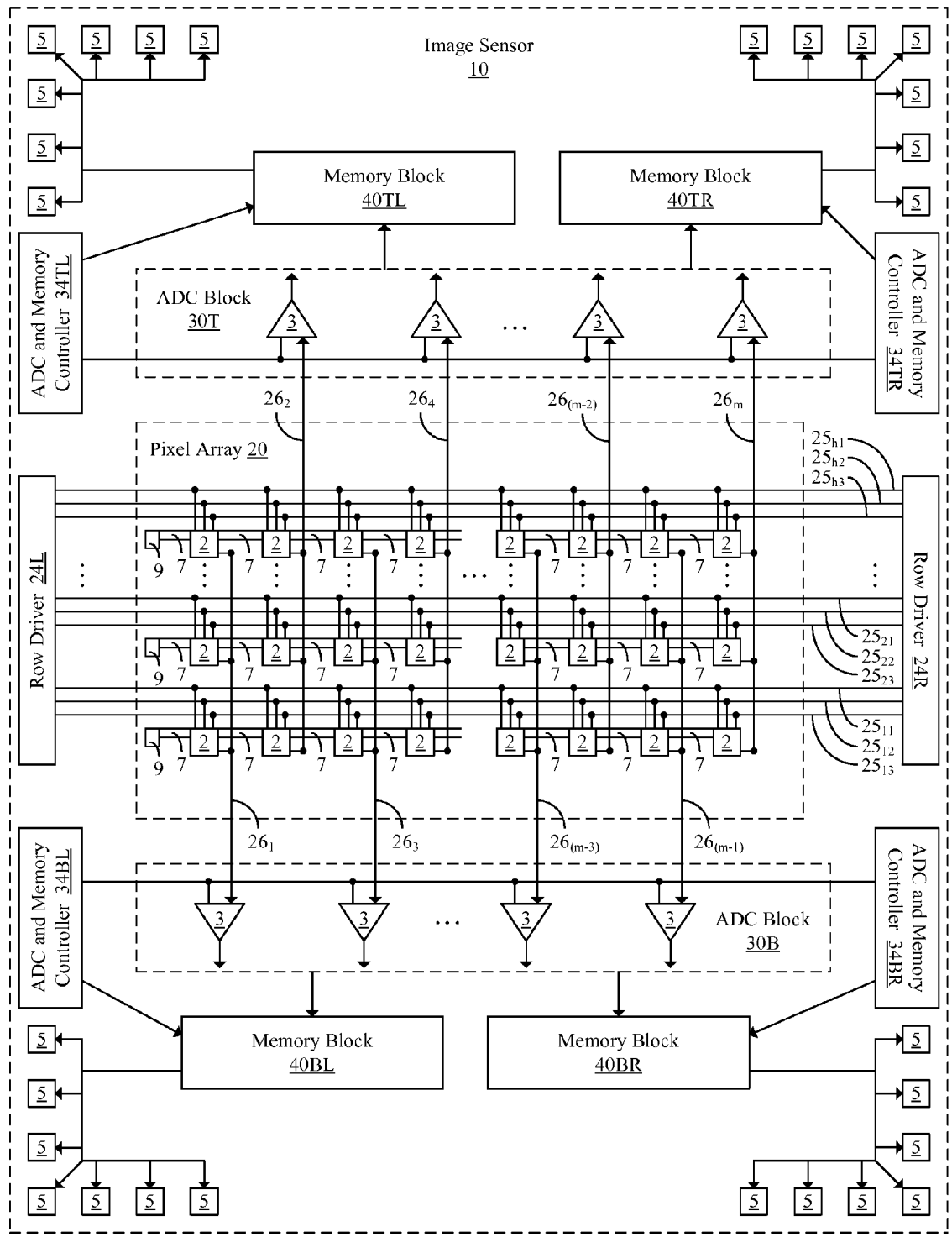
FIG. 7 illustrates an image sensor in accordance with an embodiment of the present invention.

FIG. 7 illustrates a block diagram of an image sensor 10 in accordance with an embodiment of the present invention. The image sensor 10 includes a pixel array 20, a left row driver 24L, a right row driver 24R, a top analog-to-digital conversion (ADC) block 30T, a bottom ADC block 30B, a top/left memory block 40TL, a top/right memory block 40TR, a bottom/left memory block 40BL, a bottom/right memory block 40BR, a top/left ADC and memory controller 34TL, a top/right ADC and memory controller 34TR, a bottom/left ADC and memory controller 34BL, a bottom/right ADC and memory controller 34BR, and pads 5. In various embodiments, the image sensor 10 may be, for example, a high speed complimentary metal oxide semiconductor (CMOS) image sensor, or the like.

The pixel array 20 includes a plurality of the pixels 2 (refer to FIGS. 2A and 2B) arranged in a plurality of rows and a plurality of columns. For example, the pixels 2 in the pixel array 20 may be arranged in h rows and m columns, where h and m are integer values. Each pixel 2 of the pixel array 20 is configured to sample light intensity and to provide a corresponding analog pixel signal based on the sampled light intensity. The pixel array 20 further includes a plurality of column readout lines $26_1, 26_2, 26_3, 26_4, \ldots, 26_{(m-3)}, 26_{(m-2)}, 26_{(m-1)}, 26_m$ for reading out signals from the pixels 2 in the corresponding columns. In the embodiment illustrated in FIG. 2, there is one column readout line per each column of pixels 2 in the pixel array 20. In various other embodiments, there may be two or more column readout lines per each column of pixels 2 in the pixel array 20.

With reference to FIG. 7, in various embodiments, the pixel array 20 includes an antiblooming channel 7 for each pixel 2 in the pixel array 20. Also, in various embodiments, each of the pixels 2 in each of the second to last columns of the pixel array 20 is connected by a corresponding antiblooming channel 7 to a corresponding pixel 2 in an immediately preceding column and a same row of the pixel array 20. In some such embodiments, pixels 2 that are connected to each other by a corresponding antiblooming channel 7 are connected in a same manner as the pixel 2a and the pixel 2b are connected by the antiblooming channel 7 in FIG. 4A. In various other embodiments, the configurations of antiblooming channels in FIG. 4B, 4C, 4D, or 4E may be used in the pixel array 20.

With reference to FIG. 7, in various embodiments, a drain diffusion 9 connected to a supply voltage ($V_{dd}$) from a power source (not shown) is provided for each row in the pixel array 20 next to the first column in the pixel array 20. Also, in various embodiments, each of the pixels 2 in the first column of the pixel array 20 is connected by a corresponding antiblooming channel 7 to the corresponding drain diffusion 9 for the row. In some such embodiments, the pixels 2 in the first column of the pixel array 20 are connected to the corresponding drain diffusion 9 by the corresponding antiblooming channel 7 in a same manner as the pixel 2a is connected to the common diffusion 15 of the pixel 2b by the antiblooming channel 7 in FIG. 4A. The drain diffusions 9 may allow for draining excess charges from photodiodes of the pixels 2 in the first column of the pixel array 20 that pass through the corresponding antiblooming channels 7. In various embodiments, the drain diffusions 9 comprise n type implants, or the like.

Figure 8:
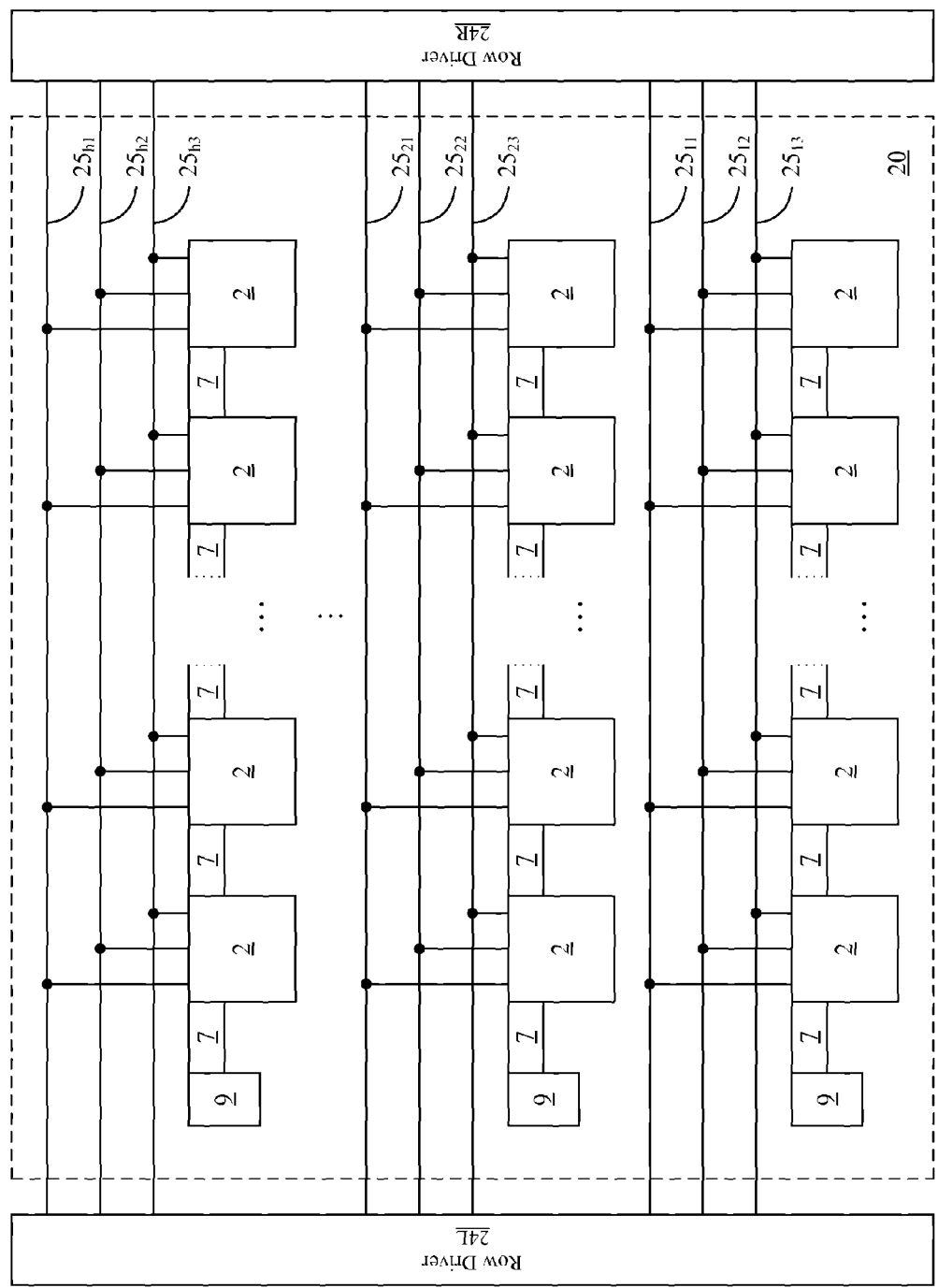
FIG. 8 illustrates a portion of an image sensor in accordance with an embodiment of the present invention.

The left row driver 24L and the right row driver 24R are configured to supply control signals to the plurality of pixels 2 in the pixel array 20. FIG. 8 illustrates a portion 120 of the image sensor 10 (refer to FIG. 7) that includes the pixel array 20, the left row driver 24L, and the right row driver 24R. With reference to FIGS. 7 and 8, in various embodiments the left row driver 24L is connected to the pixels 2 in each row of the plurality of rows of the pixel array 20 by a corresponding one or more control lines for the row. Also, in various embodiments, the right row driver 24R is connected to the pixels 2 in each row of the plurality of rows of the pixel array 20 by the same corresponding one or more control lines for the row to which the left row driver 24L is connected.

For example, pixels 2 in a first row of the pixel array 20 are connected to the control lines $25_{11}$, $25_{12}$, and $25_{13}$, which are connected to both the left row driver 24L and the right row driver 24R. In various embodiments, the left row driver 24L and the right row driver 24R are configured to drive control signals over the control lines $25_{11}$, $25_{12}$, and $25_{13}$, such as driving a transfer signal over the control line $25_{11}$, a reset signal over the control line $25_{12}$, and a row select signal over the control line $25_{13}$. In various embodiments, pixels 2 in a second row of the pixel array 20 are connected to the control lines $25_{21}$, $25_{22}$, and $25_{23}$, which are connected to both the left row driver 24L and the right row driver 24R. Similarly, in various embodiments, pixels 2 in an $h^{th}$ row of the pixel array 20 are connected to the control lines $25_{h1}$, $25_{h2}$, and $25_{h3}$, which are connected to both the left row driver 24L and the right row driver 24R.

In various embodiments, the right row driver 24R is located on an opposite side of the pixel array 20 from the left row driver 24L. Also, in various embodiments, the right row driver 24R is controllable to provide a same one or more control signals on the one or more control lines for a row of pixels 2 as are provided by the left row driver 24L on the same one or more control lines. In various embodiments, the driving of control signals on one or more control lines by the right row driver 24R occurs concurrently with the driving of the same control signals on the same one or more control lines by the left row driver 24L. In some embodiments, the right row driver 24R drives one or more control signals over one or more control lines from an opposite direction as a direction in which the left row driver 24L drives the same one or more control signals over the same one or more control lines.

The driving of same control signals from both sides of the pixel array 20 may have an affect of reducing an effective width of the control lines by two times, and so the resistance and the capacitance of the effectively reduced width control lines would lead to a factor of four reduction in a delay in the control lines. Thus, driving control signals from both sides of the pixel array 20 over a same control line may allow for reducing a delay in the control line by a factor of four as compared to a design in which control signals are only driven from one side of a pixel array.

In order to avoid a conflict of differing signals with two drivers driving the same control lines, care must be taken to ensure an approximately simultaneous change of the respective control on the left and right of the pixel array, such that control signals driven from opposite sides of the pixel array 20 at the same time on the same control line are approximately identical. It should be noted that in various embodiments each control line, such as the control line $25_{11}$, has some resistance, such as 1 kOhm or more, so the left row driver 24L and the right row driver 24R would not be shorted together even if there is a small mismatch in timing of driving the same control signals over the same control lines.

Figure 9:
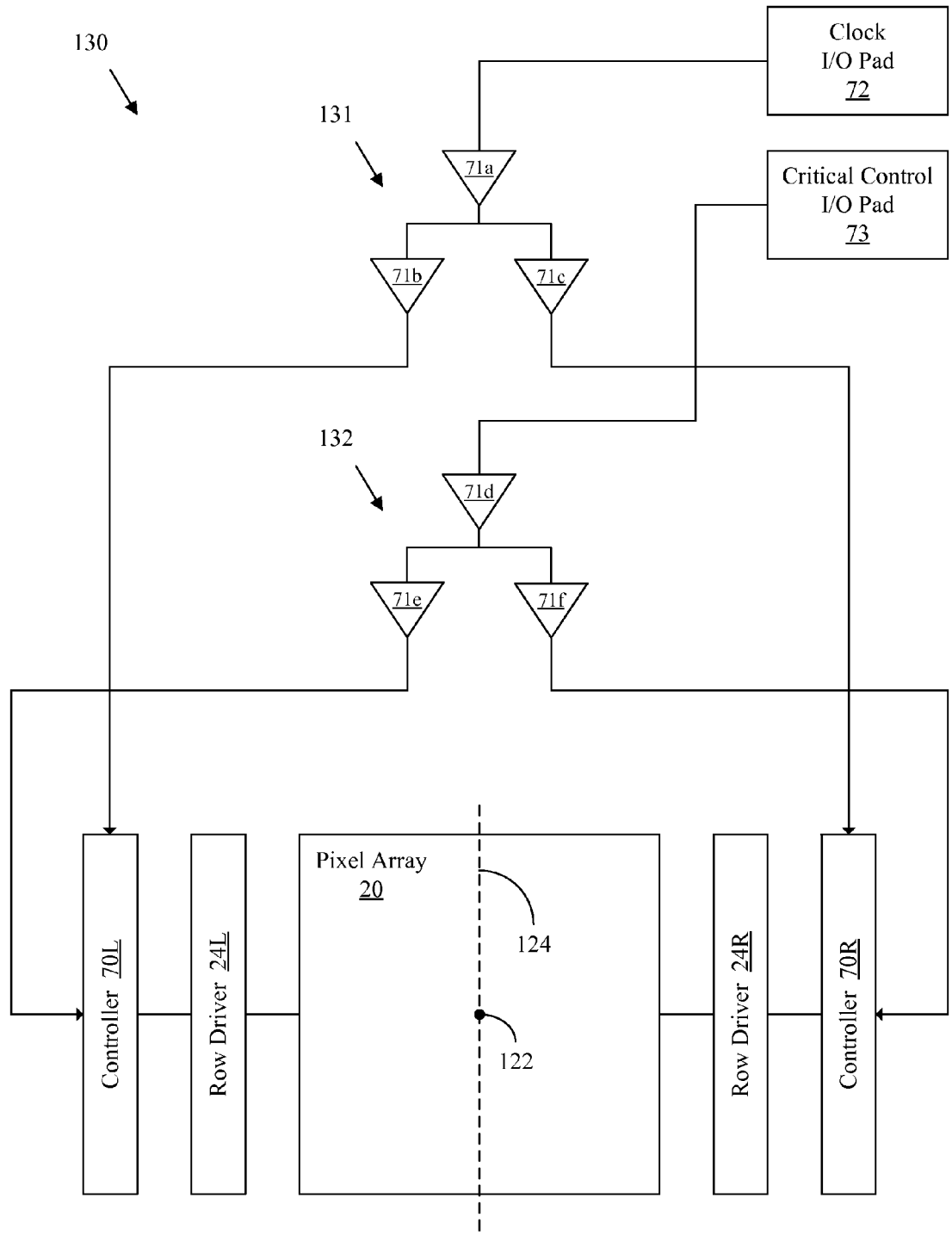
FIG. 9 illustrates a portion of an image sensor in accordance with an embodiment of the present invention.

FIG. 9 illustrates a portion 130 of an image sensor, such as the image sensor 10 (refer to FIG. 7), in accordance with an embodiment of the present invention. The portion 130 includes the pixel array 20, the left row driver 24L, the right row driver 24R, a left controller 70L, a right controller 70R, a clock I/O pad 72, a critical control I/O pad 73, a clock tree 131, and a control signal tree 132. In various embodiments, the left controller 70L controls operations of the left row driver 24L. Also, in various embodiments, the right controller 70R controls operations of the right row driver 24R. In various embodiments, the clock tree 131 allows for distributing a clock signal from the clock I/O pad 72 to the left controller 70L and the right controller 70R at least approximately simultaneously. In various embodiments, the control signal tree 132 allows for distributing a control signal from the critical control I/O pad 73 to the left controller 70L and the right controller 70R at least approximately simultaneously.

In various embodiments, the clock tree 131 includes a first buffer 71a, a second buffer 71b, and a third buffer 71c. The first buffer 71a of the clock tree 131 is connected to receive a clock signal from the clock I/O pad 72, and provides the clock signal to the second buffer 71b and the third buffer 71c. In various embodiments, a length of a signal line from the first buffer 71a to the second buffer 71b is a same length as a length of a signal line from the first buffer 71a to the third buffer 71c. In various embodiments, the second buffer 71b is connected to the left controller 70L to provide the clock signal to the left controller 70L. Similarly, in various embodiments, the third buffer 71c is connected to the right controller 70R to provide the clock signal to the right controller 70R. In various embodiments, a length of a signal line from the second buffer 71b to the left controller 70L is a same length as a length of a signal line from the third buffer 71c to the right controller 70R.

A center of the pixel array 20 is labeled 122 in FIG. 9 and a line passing through the middle of the pixel array 20 is labeled 124. In various embodiments, the first buffer 71a of the clock tree 131 is aligned with the middle 124 of the pixel array 20. Thus, the clock tree 131 allows for routing a clock signal from the clock I/O pad 72 to the left controller 70L and the right controller 70R at least approximately simultaneously. This allows for the left controller 70L to control the left row driver 24L to output a control signal at approximately an identical time that that the right controller 70R controls the right row driver 24R to output a control signal, such that there is an approximately simultaneous change at the left and right sides of the pixel array 20 for driving control signals over the same control lines.

In various embodiments, the control signal tree 132 includes a first buffer 71d, a second buffer 71e, and a third buffer 71f. The first buffer 71d of the control signal tree 132 is connected to receive a control signal from the critical control I/O pad 73, and provides the control signal to the second buffer 71e and the third buffer 71f. In various embodiments, a length of a signal line from the first buffer 71d to the second buffer 71e is a same length as a length of a signal line from the first buffer 71d to the third buffer 71f. In various embodiments, the second buffer 71e is connected to the left controller 70L to provide the control signal to the left controller 70L. Similarly, in various embodiments, the third buffer 71f is connected to the right controller 70R to provide the control signal to the right controller 70R. In various embodiments, a length of a signal line from the second buffer 71e to the left controller 70L is a same length as a length of a signal line from the third buffer 71f to the right controller 70R.

In various embodiments, the first buffer 71d of the control signal tree 132 is aligned with the middle 124 of the pixel array 20. Thus, the control signal tree 132 allows for routing a control signal from the critical control I/O pad 73 to the left controller 70L and the right controller 70R at least approximately simultaneously. This allows for the left controller 70L to be controlled to control the left row driver 24L to output a control signal at approximately an identical time that that the right controller 70R is controlled to control the right row driver 24R to output a control signal, such that there is an approximately simultaneous change at the left and right sides of the pixel array 20 for driving control signals over the same control lines.

In various embodiments, the left controller 70L is configured to issue control signals to control the left row driver 24L based on control signals received by the left controller 70L from the critical control I/O pad 73 through the control signal tree 132. The left controller 70L may be configured to control the left row driver 24L to drive signals to pixels in the pixel array 20 such as a transfer signal, a reset signal, a row select signal, or the like. In various embodiments, the right controller 70R is configured to issue control signals to control the right row driver 24R based on control signals received by the right controller 70R from the critical control I/O pad 73 through the control signal tree 132. The right controller 70R may be configured to control the right row driver 24R to drive signals to pixels in the pixel array 20 such as a transfer signal, a reset signal, a row select signal, or the like.

With reference again to FIG. 7, the top ADC block 30T includes a plurality of ADC circuits 3 that are connected to receive analog pixel signals provided from corresponding pixels 2 of the pixel array 20. The bottom ADC block 30B similarly includes a plurality of ADC circuits 3 that are connected to receive analog pixel signals provided from corresponding pixels 2 of the pixel array 20. In various embodiments, the top ADC block 30T receives analog pixel signals from pixels 2 that are in even numbered columns in the pixel array 20, while the bottom ADC block 30B receives analog pixel signals from pixels 2 that are in odd numbered columns in the pixel array 20. In various other embodiments, the top ADC block 30T receives analog pixel signals from pixels 2 that are in odd numbered columns in the pixel array 20, while the bottom ADC block 30B receives analog pixel signals from pixels 2 that are in even numbered columns in the pixel array 20.

Each ADC circuit 3 in the top ADC block 30T and the bottom ADC block 30B is connected to receive analog pixel signals provided from corresponding pixels 2 of the pixel array 20, and is configured to convert the received analog pixel signals into digital pixel signals. Examples of ADC circuits are disclosed in U.S. patent application Ser. No. 11/303,420, filed Dec. 16, 2005, entitled "Analog to Digital Converter Circuit with Offset Reduction and Image Sensor Using the Same", the entire contents of which are incorporated by reference herein. Of course, it should be understood that embodiments of the present invention are not limited to such ADC circuits, but that any suitable ADC circuits may be employed for the ADC circuits 3.

In various embodiments, such as the embodiment illustrated in FIG. 7, each column readout line $26_1, 26_2, 26_3, \ldots, 26_{(m-1)}, 26_m$, is connected to a single corresponding ADC circuit 3. In various other embodiments, each column readout line may be connected to a corresponding two or more ADC circuits 3. In various embodiments, there may be one ADC circuit 3 for each column of pixels 2 in the pixel array 20, while in various other embodiments, there may be two or more ADC circuits 3 for each column of pixels 2 in the pixel array 20. In some embodiments, each of the ADC circuits 3 in the top ADC block 30T may perform processing in parallel with the other ADC circuits 3 in the top ADC block 30T. Also, in some embodiments, each of the ADC circuits 3 in the bottom ADC block 30B may perform processing in parallel with the other ADC circuits 3 in the bottom ADC block 30B. In some embodiments, each of the ADC circuits 3 in the top ADC block 30T may perform processing in parallel with each of the ADC circuits 3 in the bottom ADC block 30B.

As illustrated in FIG. 7, in various embodiments the top ADC block 30T is located to one side of the pixel array 20 such that the ADC circuits 3 of the top ADC block 30T are located to one side of the pixel array 20. Also, in various embodiments, the ADC circuits 3 of the top ADC block 30T all receive analog pixel signals that are output from a same side of the pixel array 20, and that are output in a same direction from the pixel array 20. In some embodiments, the top ADC block 30T spans a length of a row of pixels 2 in the pixel array 20, which may be a length, for example, on the order of 10 mm to 20 mm long. Similarly, in various embodiments the bottom ADC block 30B is located to one side of the pixel array 20 such that the ADC circuits 3 of the bottom ADC block 30B are located to one side of the pixel array 20. Also, in various embodiments, the ADC circuits 3 of the bottom ADC block 30B all receive analog pixel signals that are output from a same side of the pixel array 20, and that are output in a same direction from the pixel array 20. In some embodiments, the bottom ADC block 30B spans a length of a row of pixels 2 in the pixel array 20.

The top/left memory block 40TL is connected to receive digital pixel signals provided by corresponding ADC circuits of the plurality of ADC circuits 3 of the top ADC block 30T. The top/left memory block 40TL is controllable to store the received digital pixel signals as digital pixel values, and to output the digital pixel values as digital signals to corresponding pads 5. The top/right memory block 40TR is connected to receive digital pixel signals provided by corresponding ADC circuits of the plurality of ADC circuits 3 of the top ADC block 30T. The top/right memory block 40TR is controllable to store the received digital pixel signals as digital pixel values, and to output the digital pixel values as digital signals to corresponding pads 5. In various embodiments, the outputs from ADC circuits 3 of the top ADC block 30T that are provided to a same memory block may be multiplexed onto one or more buses to be provided to the memory block.

The bottom/left memory block 40BL is connected to receive digital pixel signals provided by corresponding ADC circuits of the plurality of ADC circuits 3 of the bottom ADC block 30B. The bottom/left memory block 40BL is controllable to store the received digital pixel signals as digital pixel values, and to output the digital pixel values as digital signals to corresponding pads 5. The bottom/right memory block 40BR is connected to receive digital pixel signals provided by corresponding ADC circuits of the plurality of ADC circuits 3 of the bottom ADC block 30B. The bottom/right memory block 40BR is controllable to store the received digital pixel signals as digital pixel values, and to output the digital pixel values as digital signals to corresponding pads 5. In various embodiments, the outputs from ADC circuits 3 of the bottom ADC block 30B that are provided to a same memory block may be multiplexed onto one or more buses to be provided to the memory block.

A center of the pixel array 20 may be defined as a middle of a length of a row of pixels 2 in the pixel array 20 and as a middle of a height of a column of pixels 2 in the pixel array 20. In various embodiments, the image sensor 10 may then be described with respect to the center of the pixel array 20 as having a top/left portion, a top/right portion, a bottom/left portion, and a bottom/right portion. In various embodiments, the top/left memory block 40TL is located in the top/left portion of the image sensor 10 and outputs digital signals to corresponding pads 5 located only in the top/left portion of the image sensor 10. In various embodiments, the top/right memory block 40TR is located in the top/right portion of the image sensor 10 and outputs digital signals to corresponding pads 5 located only in the top/right portion of the image sensor 10. In various embodiments, the bottom/left memory block 40BL is located in the bottom/left portion of the image sensor 10 and outputs digital signals to corresponding pads 5 located only in the bottom/left portion of the image sensor 10. In various embodiments, the bottom/right memory block 40BR is located in the bottom/right portion of the image sensor 10 and outputs digital signals to corresponding pads 5 located only in the bottom/right portion of the image sensor 10.

In various embodiments, the pads 5 are input/output (I/O) pads, I/O ports, or the like, for outputting data from the image sensor 10. In some embodiments the pads 5 further allow for inputting data into the image sensor 10. While the image sensor 10 has been illustrated in FIG. 7 with two memory blocks 40TL, 40TR connected to the top ADC block 30T and two memory blocks 40BL, 40BR connected to the bottom ADC block 30B, it should be appreciated that, in various other embodiments, more than two memory blocks may be connected to each of the top ADC block 30T and the bottom ADC block 30B, respectively. Also, in various embodiments, less than two memory blocks may be connected to each of the top ADC block 30T and the bottom ADC block 30B, respectively.

In various embodiments, the top/left ADC and memory controller 34TL includes circuitry configured to supply control signals to control operations of corresponding ADC circuits 3 of the top ADC block 30T and to supply control signals to control an operation of the top/left memory block 40TL. In various embodiments, the top/right ADC and memory controller 34TR includes circuitry configured to supply control signals to control operations of corresponding ADC circuits 3 of the top ADC block 30T and to supply control signals to control an operation of the top/right memory block 40TR. In various embodiments, the bottom/left ADC and memory controller 34BL includes circuitry configured to supply control signals to control operations of corresponding ADC circuits 3 of the bottom ADC block 30B and to supply control signals to control an operation of the bottom/left memory block 40BL. In various embodiments, the bottom/right ADC and memory controller 34BR includes circuitry configured to supply control signals to control operations of corresponding ADC circuits 3 of the bottom ADC block 30B and to supply control signals to control an operation of the bottom/right memory block 40BR.

In some embodiments, the ADC circuits 3 of the top ADC block 30T are located between the top/left ADC and memory controller 34TL and the top/right ADC and memory controller 34TR. Also, in some embodiments, the ADC circuits 3 of the bottom ADC block 30B are located between the bottom/left ADC and memory controller 34BL and the bottom/right ADC and memory controller 34BR. While each ADC and memory controller 34TL, 34TR, 34BL, and 34BR is illustrated as a single unit, it should be appreciated that, in various embodiments, each ADC and memory controller may include an ADC controller for controlling ADC circuits, and a separate memory controller for controlling a memory block.

Figure 10:
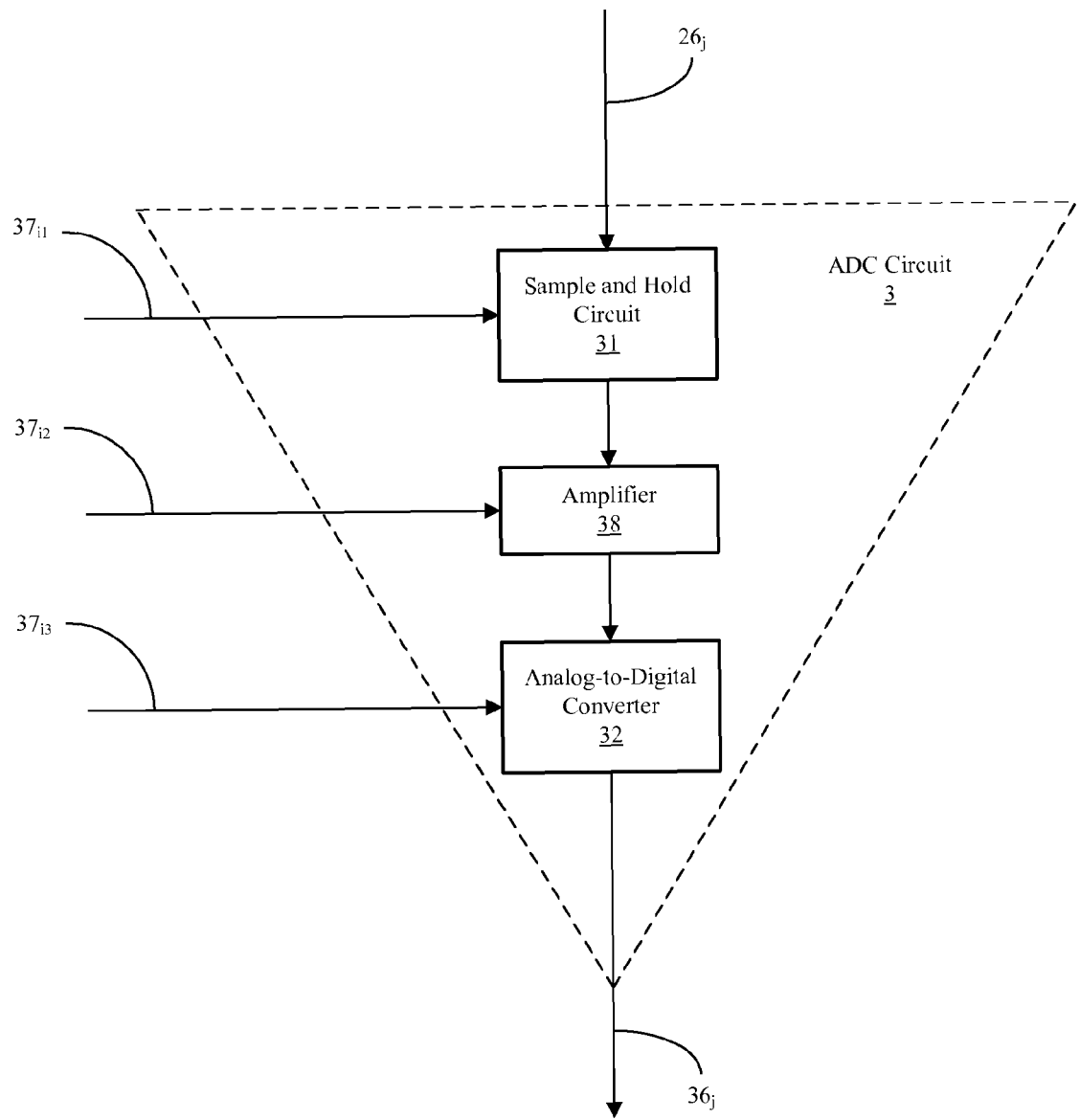
FIG. 10 illustrates a block diagram of an ADC circuit in accordance with an embodiment of the present invention.

FIG. 10 illustrates a block diagram of an embodiment of the ADC circuit 3. The ADC circuit 3 may comprise, for example, a sample-and-hold circuit 31, an amplifier 38, and an analog-to-digital converter 32. In various embodiments, the ADC circuit 3 may comprise more than one sample-and-hold circuit 31, more than one amplifier 38, and more than one analog-to-digital converter 32.

In various embodiments, the sample-and-hold circuit 31 receives analog pixel signals from corresponding pixels 2 in the pixel array 20 (refer to FIG. 7) over a corresponding column readout line $26_j$. If the analog pixel signals include, for example, both a photosignal component and a reference "reset" level component, then the sample-and-hold circuit 31 may be configured to store the photosignal component and the reference reset level component. The sample-and-hold circuit 31 may be controlled by a controller, such as an ADC and memory controller, or the like, that supplies control signals over control line $37_{i1}$. In some embodiments, a difference between the photosignal component and the reference reset level stored in the sample-and-hold circuit 31 may be amplified by the amplifier 38 and provided to the analog-to-digital converter 32. The amplifier 38 may be controlled by a controller, such as an ADC and memory controller, or the like, that supplies control signals over control line $37_{i2}$.

In various embodiments, the analog-to-digital converter 32 may be, for example, an analog-to-digital converter of a successive-approximation type, or the like. The analog-to-digital converter 32 receives analog signals provided from the amplifier 38, and the analog-to-digital converter 32 is configured to convert the received analog signals into corresponding digital pixel signals to be provided on an output line $36_j$. Operations of the analog-to-digital converter 32 may be controlled by a controller, such as an ADC and memory controller, or the like, that supplies control signals over a control line $37_{i3}$. In various embodiments, the digital pixel signals provided by the analog-to-digital converter 32 may specify digital pixel values as one or more bits, such as, for example, ten bits for each digital pixel value.

Figure 11A:
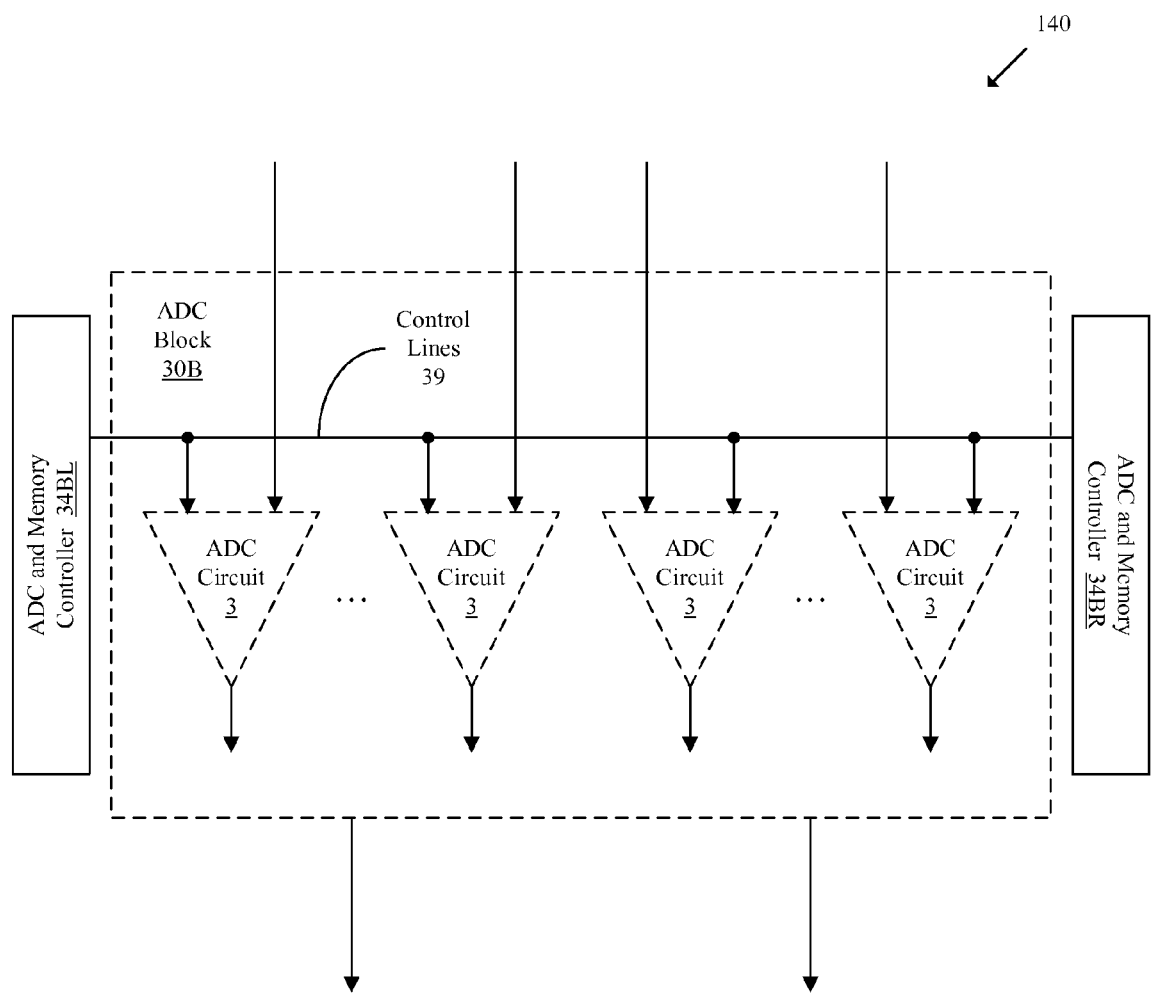
FIG. 11A illustrates a portion of an image sensor in accordance with an embodiment of the present invention.

FIG. 11A illustrates a portion 140 of the image sensor 10 (refer to FIG. 7) in accordance with an embodiment of the present invention. The portion 140 includes the bottom ADC block 30B, the bottom/left ADC and memory controller 34BL, and the bottom/right ADC and memory controller 34BR. In various embodiments, the ADC circuits 3 of the bottom ADC block 30B are located between the bottom/left ADC and memory controller 34BL and the bottom/right ADC and memory controller 34BR. In various embodiments, the bottom/left ADC and memory controller 34BL and the bottom/right ADC and memory controller 34BR are connected to the ADC circuits 3 of the bottom ADC block 30B by control lines 39. Thus, in various embodiments, the bottom/left ADC and memory controller 34BL and the bottom/right ADC and memory controller 34BR drive control signals over the same control lines 39.

The control signals sent on the control lines 39 from the bottom/left ADC and memory controller 34BL and the bottom/right ADC and memory controller 34BR may control, for example, operations of the ADC circuits 3 of the bottom ADC block 30B to perform conversion of analog pixel signals into digital pixel signals. In various embodiments, the control lines 39 include one or more control lines to sample-and-hold circuits, such as the control line $37_{i1}$ (refer to FIG. 10), one or more control lines to amplifiers, such as the control line $37_{i2}$ (refer to FIG. 10), and one or more control lines to analog-to-digital converters, such as the control line $37_{i3}$ (refer to FIG. 10). In some embodiments, the bottom/left ADC and memory controller 34BL and the bottom/right ADC and memory controller 34BR are configured to drive the same control signals on the control lines 39 at a same time. In order to have the bottom/left ADC and memory controller 34BL and the bottom/right ADC and memory controller 34BR drive the same control signals at the same time, a clock signal (not shown) that is provided to the bottom/left ADC and memory controller 34BL and to the bottom/right ADC and memory controller 34BR may be routed from a location between the two ADC and memory controllers by a clock tree such that each ADC and memory controller 34BL, 34BR receives the clock signal at approximately the same time.

By driving control signals to the ADC circuits 3 of the bottom ADC block 30B from both the bottom/left ADC and memory controller 34BL and the bottom/right ADC and memory controller 34BR, a propagation delay for sending the control signals to all of the ADC circuits 3 of the bottom ADC block 30B may be reduced as compared to configurations in which a single ADC and memory controller drives signals from only one side of the bottom ADC block 30B to all of the ADC circuits 3. The reduction in the propagation delay for the control signals is realized because the control signals no longer have to travel all the way across the bottom ADC block 30B before reaching all of the ADC circuits 3 of the bottom ADC block 30B, but rather the control signals are sent from both sides of the bottom ADC block 30B and ideally converge in the middle of the bottom ADC block 30B. Since the bottom ADC block 30B usually spans a length of the pixel array 20 (refer to FIG. 7), and the pixel array 20 may be, for example, on the order of 10 mm to 20 mm long, a propagation delay when there is only a single ADC and memory controller for an ADC block can be significant. Thus, reducing the propagation delay of the control signals may allow for increasing a speed of ADC circuit operations.

Figure 11B:
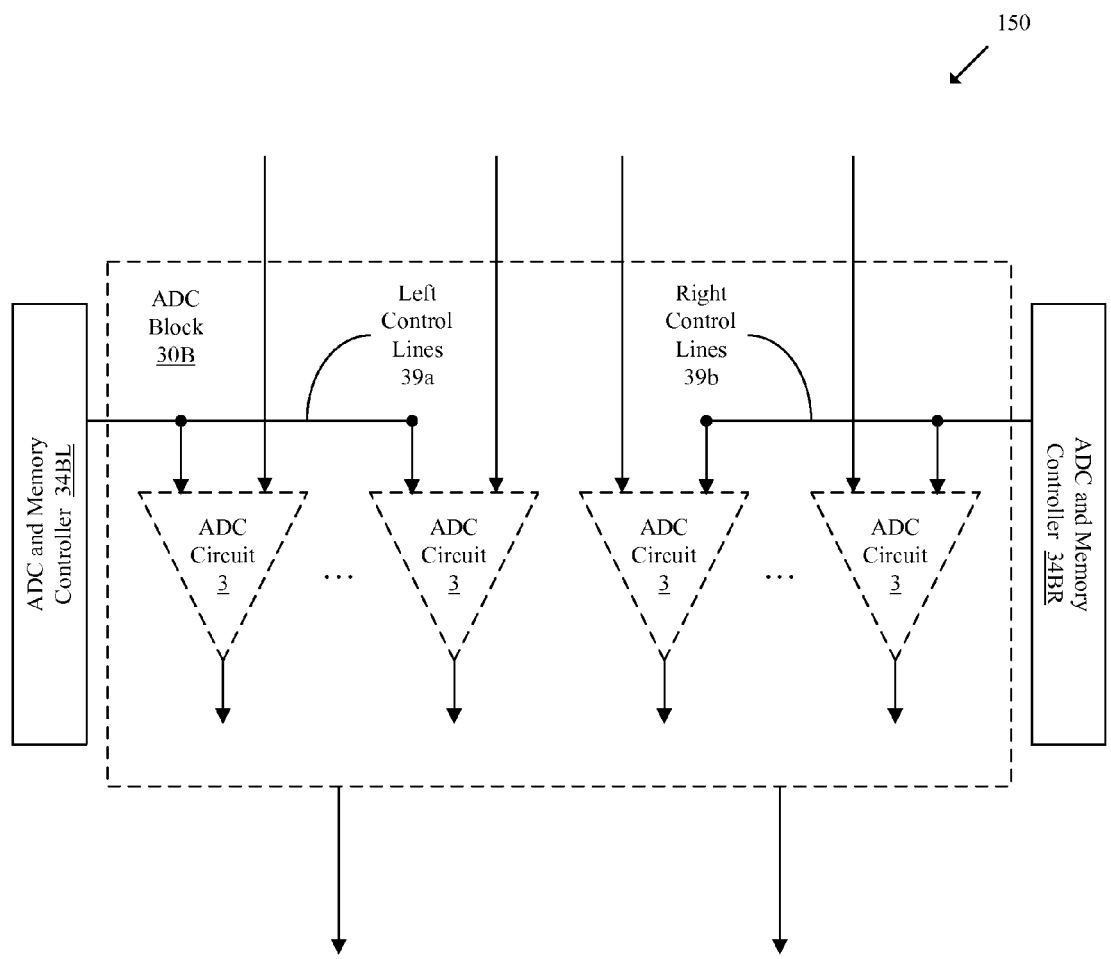
FIG. 11B illustrates a portion of an image sensor in accordance with an embodiment of the present invention.

FIG. 11B illustrates a portion 150 of the image sensor 10 (refer to FIG. 7) in accordance with another embodiment of the present invention. The portion 150 of the embodiment in FIG. 11B is the same as the portion 140 of the embodiment of FIG. 11A, except that left control lines 39a from the bottom/left ADC and memory controller 34BL and right control lines 39b from the bottom/right ADC and memory controller 34BR are separated. In various embodiments, the bottom/left ADC and memory controller 34BL is configured to drive control signals over the left control lines 39a at a same time that the bottom/right ADC and memory controller 34BR is driving the same control signals over the right control lines 39b. Even with the separated control lines, a propagation delay for sending the control signals to the ADC circuits 3 of the bottom ADC block 30B can still be reduced as compared with a configuration with a single ADC and memory controller for the bottom ADC block 30B.

In various embodiments, the bottom/left ADC and memory controller 34BL is connected to drive control signals over the left control lines 39a to a subset of the ADC circuits 3 of the bottom ADC block 30B, and the bottom/right ADC and memory controller 34BR is connected to drive control signals over the right controls lines 39b to the remaining ADC circuits 3 of the bottom ADC block 30B that are not connected to the bottom/left ADC and memory controller 34BL. In some embodiments, the bottom/left ADC and memory controller 34BL is connected to drive control signals over the left control lines 39a to all of the ADC circuits 3 of the bottom ADC block 30B that are located on a left portion of the image sensor 10 (refer to FIG. 7) with respect to a center of the pixel array 20. Also, in some embodiments, the bottom/right ADC and memory controller 34BR is connected to drive control signals over the right control lines 39b to all of the ADC circuits 3 of the bottom ADC block 30B that are located on a right portion of the image sensor 10 (refer to FIG. 7) with respect to the center of the pixel array 20. The center of the pixel array 20 (refer to FIG. 7) may be defined, for example, as a middle of a row of pixels 2 in the pixel array 20.

Figure 12A:
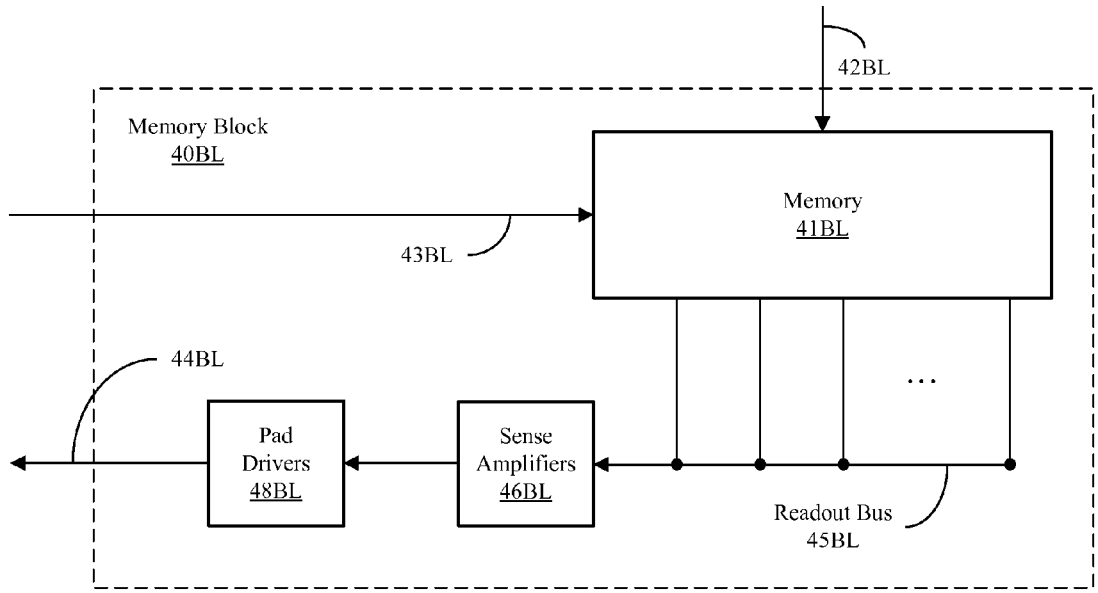
FIG. 12A illustrates a block diagram of a memory block in accordance with an embodiment of the present invention.

FIG. 12A illustrates a block diagram of the bottom/left memory block 40BL in accordance with an embodiment of the present invention. In various embodiments, the bottom/left memory block 40BL comprises a memory 41BL, a readout bus 45BL, one or more sense amplifiers 46BL, and one or more pad drivers 48BL. Digital pixel signals are input on an input bus 42BL to the memory 41BL. Also, digital pixel signals are output from the pad drivers 48BL on an output bus 44BL. The bottom/left ADC and memory controller 34BL (refer to FIG. 7) provides control signals on one or more memory control lines 43BL to control operations of the memory 41BL to perform, for example, read operations, write operations, or the like. In various embodiments, the bottom/left ADC and memory controller 34BL (refer to FIG. 7) is located to the left of the memory 41BL. In various other embodiments, the bottom/left ADC and memory controller 34BL (refer to FIG. 7) may be located to other sides of the memory 41BL, such as above the memory 41BL, below the memory 41BL, or to the right of the memory 41BL.

Figure 12B:
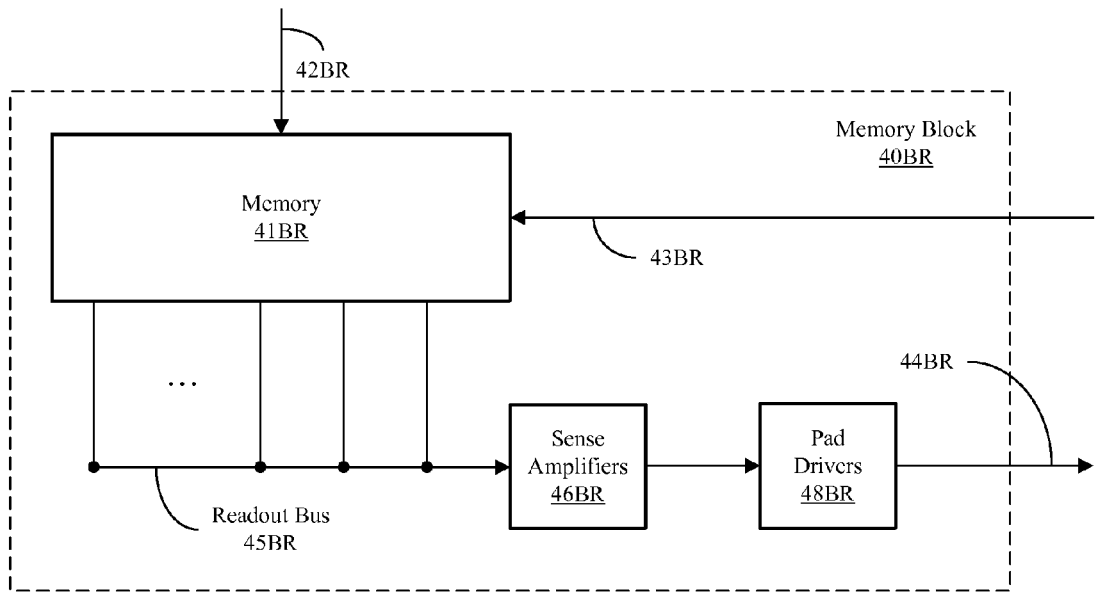
FIG. 12B illustrates a block diagram of a memory block in accordance with an embodiment of the present invention.
Figure 12C:
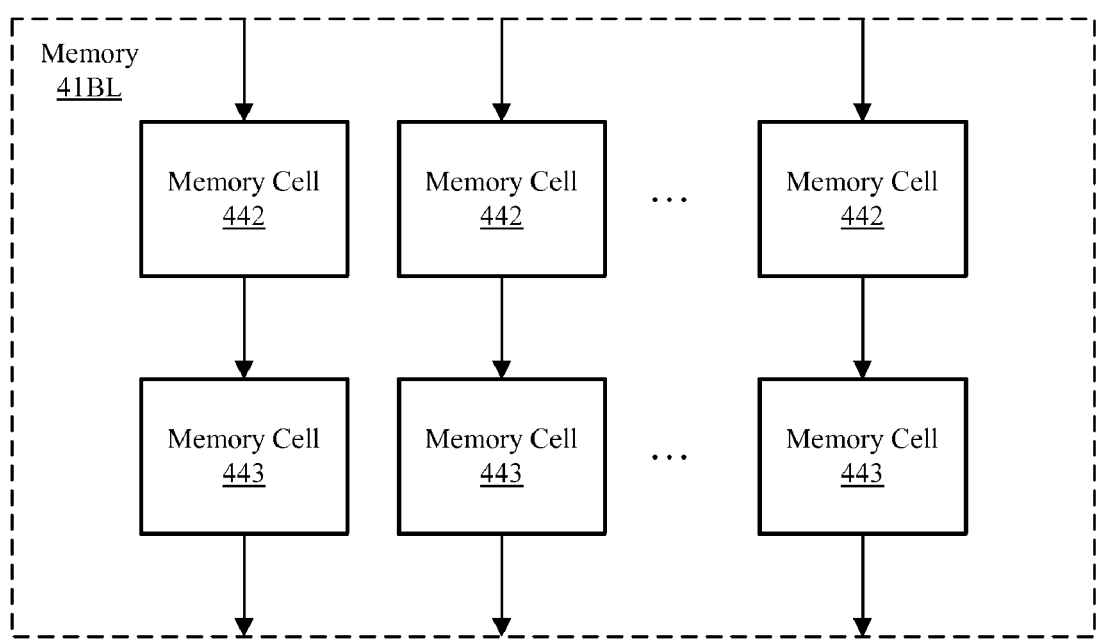
FIG. 12C illustrates a block diagram of a memory in accordance with an embodiment of the present invention.

An embodiment of the memory 41BL is illustrated by the block diagram of FIG. 12C. In various embodiments, the memory 41BL comprises a plurality of memory cells 442 in a first row, and a plurality of memory cells 443 in a second row. The memory cells 442 and the memory cells 443 may comprise, for example, DRAM cells, SRAM cells, or the like, for storing digital data. The bottom/left ADC and memory controller 34BL (refer to FIG. 7) may control the memory cells 442 in the first row of the memory 41BL to read in data during a first time period while the bottom/left ADC and memory controller 34BL controls the memory cells 443 in the second row to output data to the readout bus 45BL (refer to FIG. 12A). The bottom/left ADC and memory controller 34BL (refer to FIG. 7) may also control the memory cells 442 in the first row to output data during a second time period while the bottom/left ADC and memory controller 34BL controls the memory cells 443 in the second row to read in data from corresponding memory cells 442. Various other embodiments for the memory 41BL are possible. For example, in various embodiments, the memory cells 442 in the first row may also be connected to output data to a readout bus that is in addition to the readout bus 45BL (refer to FIG. 12A).

Referring to FIGS. 12A and 12C, in various embodiments, the readout bus 45BL of the bottom/left memory block 40BL is connected to the memory cells 443 in the second row of the memory 41BL and is also connected to the one or more sense amplifiers 46BL. The readout bus 45BL may comprise one or more bit lines. In various embodiments, the memory 41BL has a number of memory cells 443 in the second row that is equal to a number of ADC circuits 3 (refer to FIG. 7) that supply digital pixel signals to the bottom/left memory block 40BL. Also, in various embodiments, the readout bus 45BL spans a length of the second row of memory cells 443 in the memory 41BL. In some embodiments, the bottom/left memory block 40BL comprises a plurality of readout buses, where each readout bus of the plurality of readout buses is selectively connected to corresponding memory cells in the memory 41BL. In various embodiments, the one or more sense amplifiers 46BL sense digital signals that are placed onto the readout bus 45BL from the memory cells 443 in the second row of the memory 41BL. In various embodiments, there is one sense amplifier 46BL for each bit line of the readout bus 45BL. The output of the one or more sense amplifiers 46BL is provided to the one or more pad drivers 48BL. Each of the one or more pad drivers 48BL may comprise, for example, a buffer for driving signals to pads 5 (refer to FIG. 7) over the output bus 44BL.

FIG. 12B illustrates a block diagram of the bottom/right memory block 40BR in accordance with an embodiment of the present invention. In various embodiments, the bottom/right memory block 40BR comprises a memory 41BR, a readout bus 45BR, one or more sense amplifiers 46BR, and one or more pad drivers 48BR. Digital pixel signals are input on an input bus 42BR to the memory 41BR. Also, digital pixel signals are output from the pad drivers 48BR on an output bus 44BR. The bottom/right ADC and memory controller 34BR (refer to FIG. 7) provides control signals on one or more memory control lines 43BR to control operations of the memory 41BR to perform, for example, read operations, write operations, or the like. In various embodiments, the bottom/right ADC and memory controller 34BR (refer to FIG. 7) is located to the right of the memory 41BR. In various other embodiments, the bottom/right ADC and memory controller 34BR (refer to FIG. 7) may be located to other sides of the memory 41BR, such as above the memory 41BR, below the memory 41BR, or to the left of the memory 41BR.

Referring to FIGS. 12A and 12B, in various embodiments, digital signals are transferred on the readout bus 45BL from the memory 41BL to the sense amplifiers 46BL in an opposite direction to a direction in which digital signals are transferred on the readout bus 45BR from the memory 41BR to the sense amplifiers 46BR. Moreover, in various embodiments, the bottom/left memory block 40BL has its own sense amplifiers 46BL and its own pad drivers 48BL that can drive data signals to nearby pads 5 (refer to FIG. 7). The readout of data on readout bus 45BL may allow for data signals to travel to the left over the readout bus 45BL to the one or more sense amplifiers 46BL. Similarly, the bottom/right memory block 40BR has its own sense amplifiers 46BR and its own pad drivers 48BR that can drive data signals to nearby pads 5 (refer to FIG. 7). The readout of data on readout bus 45BR may allow for data signals to travel to the right over the readout bus 45BR to the one or more sense amplifiers 46BR.

Figure 13:
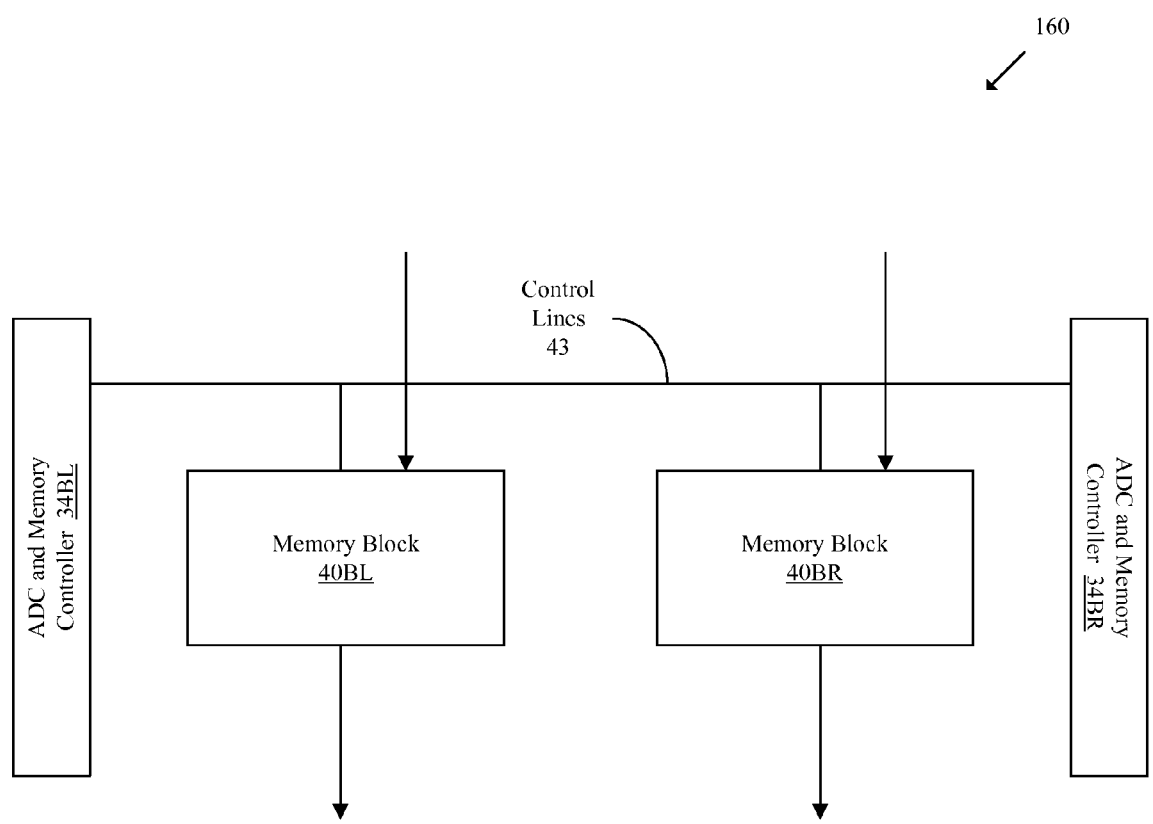
FIG. 13 illustrates a portion of an image sensor in accordance with an embodiment of the present invention.

FIG. 13 illustrates a portion 160 of the image sensor 10 (refer to FIG. 7) in accordance with an embodiment of the present invention. The portion 160 includes the bottom/left memory block 40BL, the bottom/right memory block 40BR, the bottom/left ADC and memory controller 34BL, and the bottom/right ADC and memory controller 34BR. In various embodiments, the bottom/left memory block 40BL and the bottom/right memory block 40BR are located between the bottom/left ADC and memory controller 34BL and the bottom/right ADC and memory controller 34BR. In various embodiments, the bottom/left ADC and memory controller 34BL and the bottom/right ADC and memory controller 34BR are connected to the bottom/left memory block 40BL and the bottom/right memory block 40BR by control lines 43. Thus, in various embodiments, the bottom/left ADC and memory controller 34BL and the bottom/right ADC and memory controller 34BR drive control signals over the same control lines 43.

The control signals sent on the control lines 43 from the bottom/left ADC and memory controller 34BL and the bottom/right ADC and memory controller 34BR may control, for example, operations of the bottom/left memory block 40BL and the bottom/right memory block 40BR to perform input and output of digital pixel signals. In some embodiments, the bottom/left ADC and memory controller 34BL and the bottom/right ADC and memory controller 34BR are configured to drive the same control signals on the control lines 43 at a same time. In order to have the bottom/left ADC and memory controller 34BL and the bottom/right ADC and memory controller 34BR drive the same control signals at the same time, a clock signal (not shown) that is provided to the bottom/left ADC and memory controller 34BL and to the bottom/right ADC and memory controller 34BR may be routed from a location between the two ADC and memory controllers by a clock tree such that each ADC and memory controller 34BL, 34BR receives the clock signal at approximately the same time.

Figure 14:
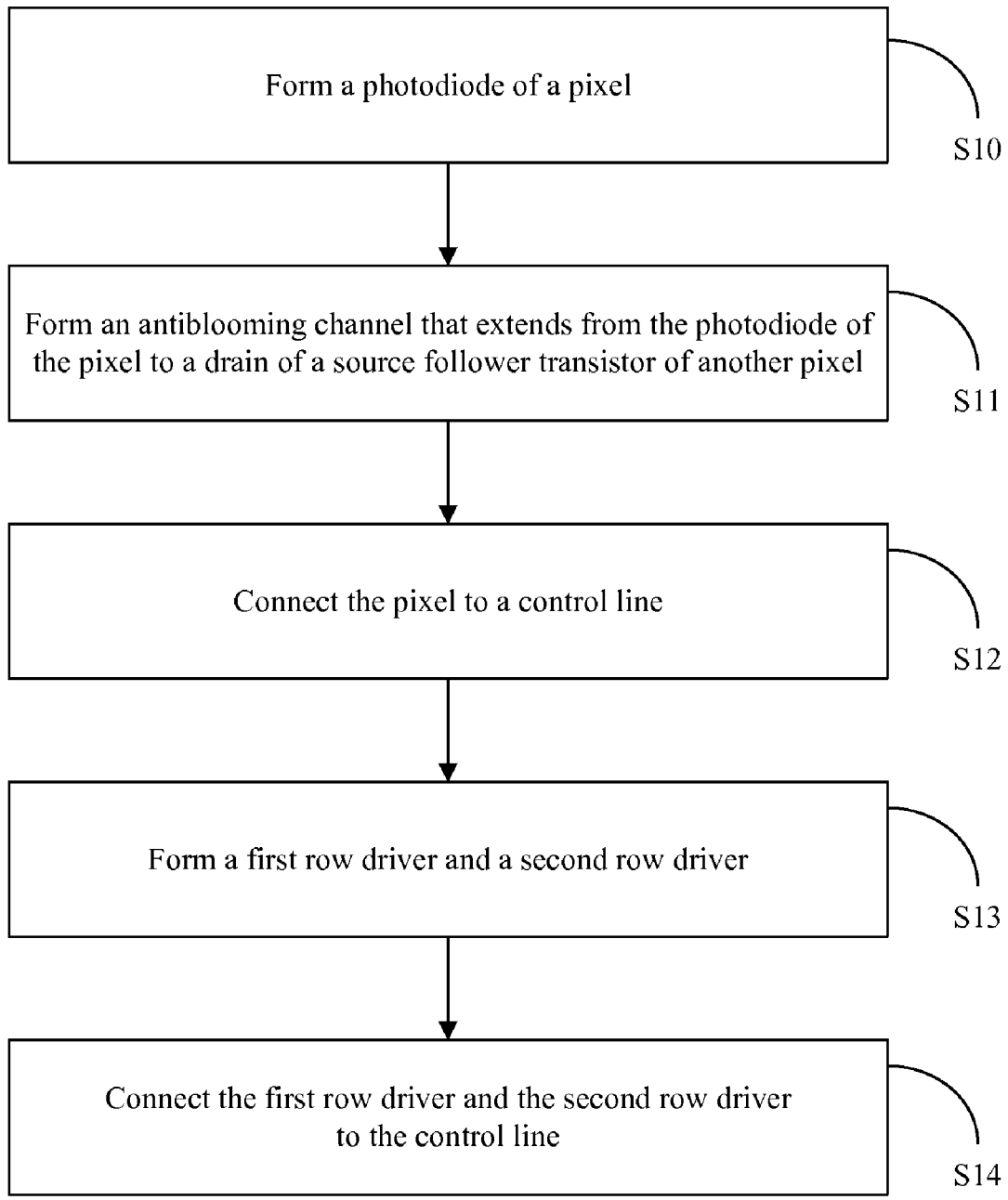
FIG. 14 illustrates a flowchart of a method of manufacturing an image sensor in accordance with an embodiment of the present invention.

FIG. 14 illustrates a flowchart of a method of manufacturing an image sensor in accordance with an embodiment of the present invention. It should be appreciated that the steps shown in FIG. 14 can be performed in different orders than the order illustrated in FIG. 14 and that, in various embodiments, two or more of the steps shown in FIG. 14 can be performed concurrently. In S10, a photodiode of a pixel is formed, and the method continues to S11. In S11, an antiblooming channel is formed that extends from the photodiode of the pixel to a drain of a source follower transistor of another pixel, and the method continues to S12. In various embodiments, the forming of the antiblooming channel includes depositing an n type implant. Also, in various embodiments, the forming of the antiblooming channel occurs concurrently with at least a portion of the forming of the photodiode.

In some embodiments, the forming of the antiblooming channel comprises forming the antiblooming channel to have a dose for an n type implant that is less than a dose of an n type implant of the photodiode. In various embodiments, the forming of the antiblooming channel comprises forming the antiblooming channel to have a same dose for an n type implant of the antiblooming channel as a dose of an n type implant of the photodiode, and forming the antiblooming channel with a width that is sufficiently narrower than a width of the photodiode such that a full depletion potential of the antiblooming channel is less than a full depletion potential of the photodiode.

In S12, the pixel is connected to a control line, and the method continues to S13. In S13, a first row driver and a second row driver are formed, and the method continues to S14. In some embodiments, the forming of the first row driver and the second row driver comprises forming the second row driver on an opposite side of the pixel from the first row driver. In S14, the first row driver and the second row driver are connected to the control line.

Figure 15:
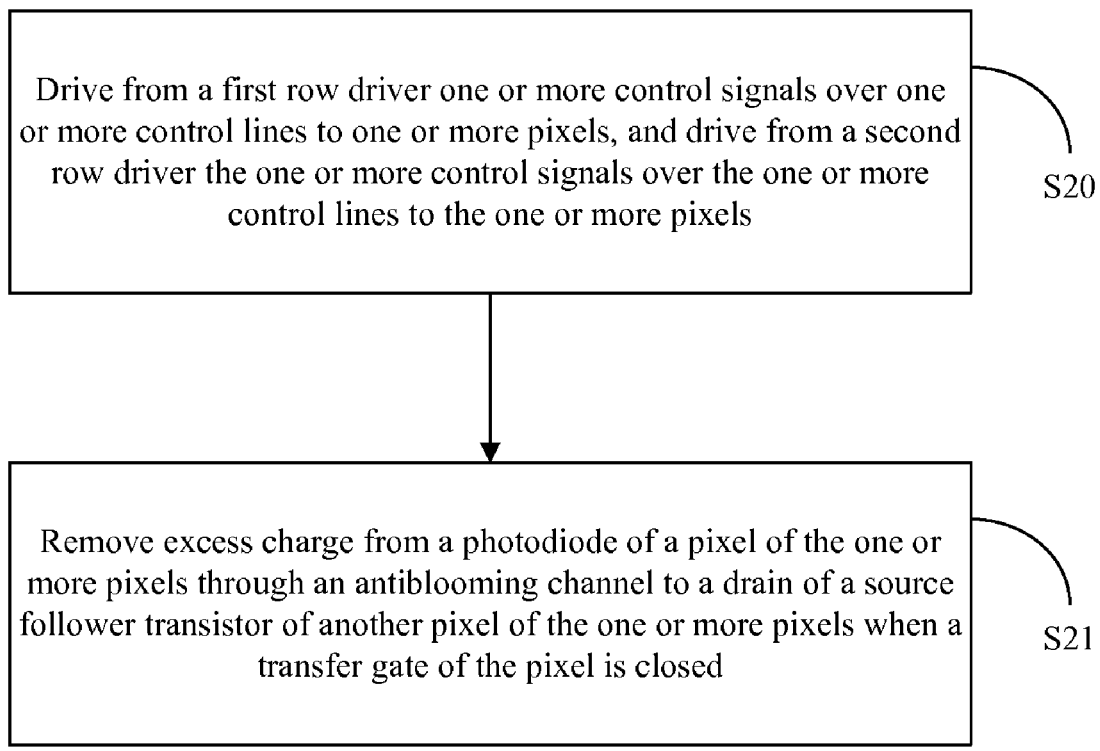
FIG. 15 illustrates a flowchart of a method in an image sensor in accordance with an embodiment of the present invention.

FIG. 15 illustrates a flowchart of a method in an image sensor in accordance with an embodiment of the present invention. It should be appreciated that the steps shown in FIG. 15 can be performed in a different order than the order illustrated in FIG. 15 and that, in various embodiments, the steps shown in FIG. 15 can be performed concurrently. In S20, one or more control signals are driven from a first row driver over one or more control lines to one or more pixels, and the one or more control signals are driven from a second row driver over the one or more control lines to the one or more pixels. In various embodiments, the driving from the second row driver occurs concurrently with the driving from the first row driver. Also, in various embodiments, the second row driver drives the one or more control signals over the one or more control lines from an opposite direction as a direction in which the first row driver drives the one or more control signals over the one or more control lines. In S21, excess charge is removed from a photodiode of a pixel of the one or more pixels through an antiblooming channel to a drain of a source follower transistor of another pixel of the one or more pixels when a transfer gate of the pixel is closed.

Figure 16:
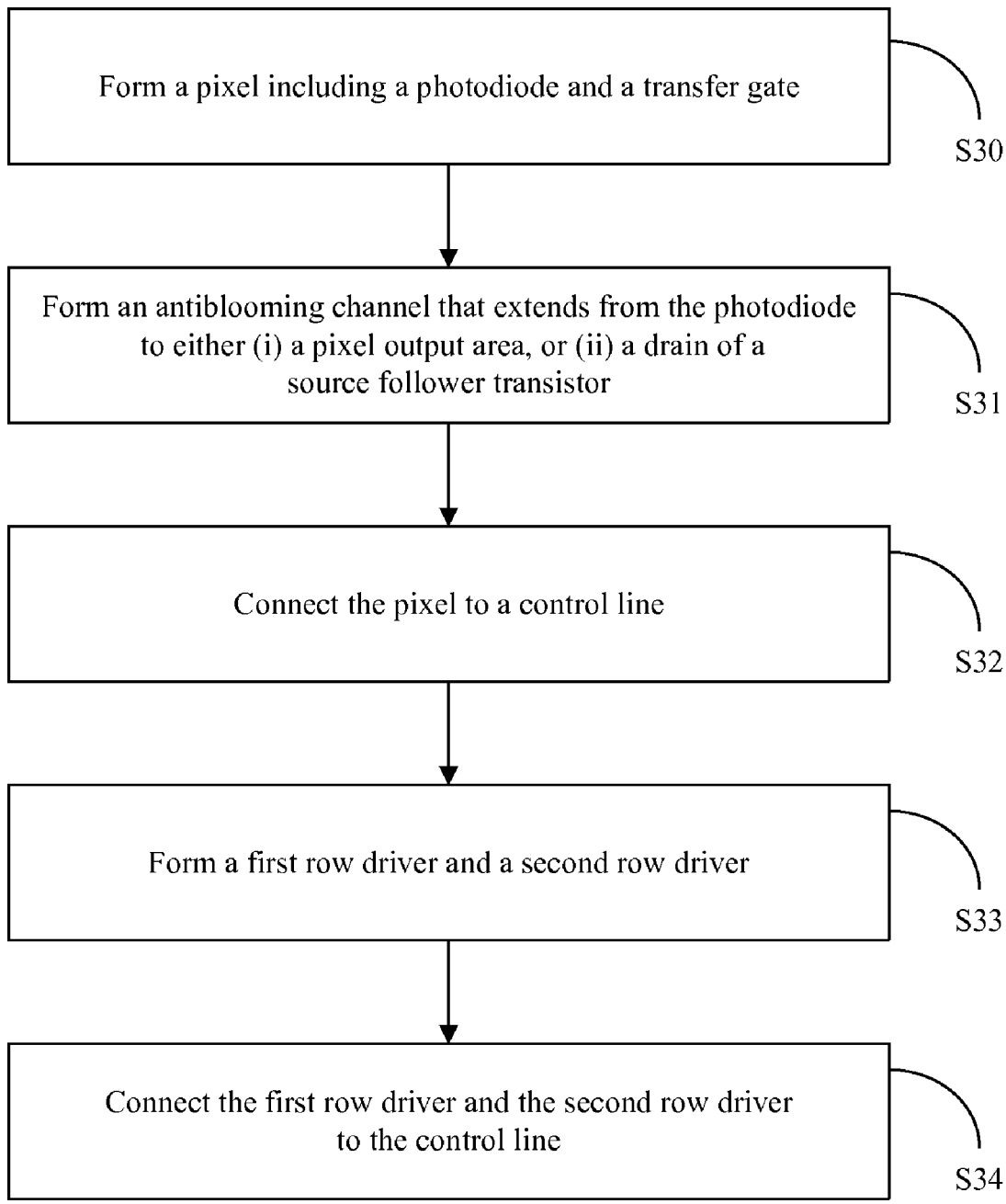
FIG. 16 illustrates a flowchart of a method of manufacturing an image sensor in accordance with an embodiment of the present invention.

FIG. 16 illustrates a flowchart of a method of manufacturing an image sensor in accordance with an embodiment of the present invention. It should be appreciated that the steps shown in FIG. 16 can be performed in different orders than the order illustrated in FIG. 16 and that, in various embodiments, two or more of the steps shown in FIG. 16 can be performed concurrently. In S30, a pixel is formed including a photodiode and a transfer gate, and the method continues to S31. In S31, an antiblooming channel is formed that extends from the photodiode to either (i) a pixel output area, or (ii) a drain of a source follower transistor, and the method continues to S32.

In various embodiments, the forming of the antiblooming channel includes forming the antiblooming channel to have a full depletion potential that is higher than a threshold leakage voltage of the transfer gate. In some embodiments, the forming of the antiblooming channel includes depositing an n type implant, and the forming of the antiblooming channel occurs concurrently with at least a portion of the forming of the pixel.

In various embodiments, the forming of the antiblooming channel includes forming the antiblooming channel to have a same dose for an n type implant of the antiblooming channel as a dose of an n type implant of the photodiode, and forming the antiblooming channel with a width that is sufficiently narrower than a width of the photodiode such that a full depletion potential of the antiblooming channel is less than a full depletion potential of the photodiode. In some embodiments, the forming of the antiblooming channel includes forming the antiblooming channel to have a dose for an n type implant that is less than a dose of an n type implant of the photodiode.

In various embodiments, the forming of the antiblooming channel includes forming the antiblooming channel to extend from the photodiode to the pixel output area, and the method further includes connecting the pixel output area to a column readout line. In various embodiments, the forming of the antiblooming channel includes forming the antiblooming channel to extend from the photodiode to the drain of the source follower transistor.

In S32, the pixel is connected to a control line, and the method continues to S33. In S33, a first row driver and a second row driver are formed, and the method continues to S34. In some embodiments, the forming of the first row driver and the second row driver comprises forming the second row driver on an opposite side of the pixel from the first row driver. In S34, the first row driver and the second row driver are connected to the control line.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. For example, although some of the above embodiments have been described with reference to the formation of n type implants in a p type substrate, various other embodiments may equally use p type implants in an n type substrate. Various modifications and changes that come within the meaning and range of equivalency of the claims are intended to be within the scope of the invention.

What is claimed is:

1. A pixel array, comprising:
a pixel comprising a photodiode and a transfer gate; and
an antiblooming channel extending from the photodiode to a drain of a source follower transistor.

2. The pixel array of claim 1,
said antiblooming channel having a full depletion potential that is higher than a threshold leakage voltage of the transfer gate.

3. The pixel array of claim 1,
wherein the antiblooming channel allows for charge above a certain level in the photodiode to flow out of the photodiode when the transfer gate is closed.

4. The pixel array of claim 1,
said antiblooming channel comprising a buried n type implant.

5. The pixel array of claim 4,
said photodiode comprising a buried n type implant with a same dose as a dose of the buried n type implant of said antiblooming channel.

6. The pixel array of claim 5,
said antiblooming channel having a width that is sufficiently narrower than a width of said photodiode such that a full depletion potential of said antiblooming channel is less than a full depletion potential of said photodiode.

7. The pixel array of claim 1,
said antiblooming channel comprising a buried n type implant with a dose less than a dose of a buried n type implant of said photodiode.

8. The pixel array of claim 1,
said pixel including the source follower transistor.

9. The pixel array of claim 1,
said source follower transistor part of another pixel that is adjacent to said pixel.

10. A pixel array, comprising:
a pixel comprising a photodiode and a transfer gate; and
an antiblooming channel extending from the photodiode to a pixel output area
said pixel including the pixel output area;
wherein the pixel output area is connected to a column readout line.

11. A pixel array, comprising:
a pixel comprising a photodiode and a transfer gate; and
an antiblooming channel extending from the photodiode to a pixel output area;
said pixel output area part of another pixel that is adjacent to said pixel.

12. A method of manufacturing a pixel array, comprising:
forming a pixel including a photodiode and a transfer gate; and
forming an antiblooming channel that extends from the photodiode to a drain of a source follower transistor.

13. The method of claim 12, said forming the antiblooming channel comprising:
forming the antiblooming channel to have a full depletion potential that is higher than a threshold leakage voltage of the transfer gate.

14. The method of claim 12,
said forming the antiblooming channel comprising depositing an n type implant; and
said forming the antiblooming channel occurring concurrently with at least a portion of said forming the pixel.

15. The method of claim 12,
said forming the antiblooming channel comprising forming the antiblooming channel to have a same dose for an n type implant of the antiblooming channel as a dose of an n type implant of the photodiode, and forming the antiblooming channel with a width that is sufficiently narrower than a width of the photodiode such that a full depletion potential of the antiblooming channel is less than a full depletion potential of the photodiode.

16. The method of claim 12,
said forming the antiblooming channel comprising forming the anitblooming channel to have a dose for an n type implant that is less than a dose of an n type implant of the photodiode.

17. A method of manufacturing a pixel array, comprising:
forming a pixel including a photodiode and a transfer gate; and
forming an antiblooming channel that extends from the photodiode to a pixel output area; and
connecting the pixel output area to a column readout line.

18. An image sensor, comprising:
a pixel array comprising a plurality of pixels;
said pixel array including an antiblooming channel from a photodiode of a pixel of the plurality of pixels to a drain of a source follower transistor of another pixel of the plurality of pixels.

19. The image sensor of claim 18,
said antiblooming channel comprising a buried n type implant.

20. The image sensor of claim 19,
said photodiode comprising a buried n type implant with a same dose as a dose of the buried n type implant of said antiblooming channel.

21. The image sensor of claim 20,
said antiblooming channel having a width that is sufficiently narrower than a width of said photodiode such that a full depletion potential of said antiblooming channel is less than a full depletion potential of said photodiode.

22. The image sensor of claim 18,
said antiblooming channel comprising a buried n type implant with a dose less than a dose of a buried n type implant of said photodiode.

23. The image sensor of claim 18,
said antiblooming channel comprising a buried n type implant with approximately a minimum dose that causes the antiblooming channel to have a higher full depletion potential than a threshold leakage voltage of a transfer gate of said pixel.

24. The image sensor of claim 18,
said antiblooming channel formed such that the antiblooming channel allows for excess charge from the photodiode of the pixel to be removed to the drain of the source follower transistor of said another pixel rather than to leak over a closed transfer gate of the pixel.

25. The image sensor of claim 18,
said plurality of pixels arranged in a plurality of rows and a plurality of columns;
said image sensor further comprising a first row driver and a second row driver;
said first row driver connected to one or more pixels in a row of the plurality of rows by one or more control lines; and
said second row driver connected to the one or more pixels in the row by the one or more control lines.

26. The image sensor of claim 25,
said second row driver located on an opposite side of said pixel array from said first row driver.

27. A method of manufacturing an image sensor, comprising:
forming a photodiode of a pixel; and
forming an antiblooming channel that extends from the photodiode of the pixel to a drain of a source follower transistor of another pixel.

28. The method of claim 27,
said forming the anitblooming channel comprising depositing an n type implant; and
said forming the antiblooming channel occurring concurrently with at least a portion of said forming the photodiode.

29. The method of claim 27,
said forming the antiblooming channel comprising forming the antiblooming channel to have a same dose for an n type implant of the antiblooming channel as a dose of an n type implant of the photodiode, and forming the antiblooming channel with a width that is sufficiently narrower than a width of the photodiode such that a full depletion potential of the antiblooming channel is less than a full depletion potential of the photodiode.

30. The method of claim 27,
said forming the antiblooming channel comprising forming the anitblooming channel to have a dose for an n type implant that is less than a dose of an n type implant of the photodiode.

31. The method of claim 27, further comprising:
connecting the pixel to a control line;
forming a first row driver and a second row driver; and
connecting the first row driver and the second row driver to the control line.

32. The method of claim 31,
said forming the first row driver and the second row driver comprising forming the second row driver on an opposite side of the pixel from the first row driver.

33. An image sensor, comprising:
a pixel array comprising a plurality of pixels arranged in a plurality of rows and a plurality of columns;
a first row driver connected to one or more pixels in a row of the plurality of rows by one or more control lines;
a second row driver connected to the one or more pixels in the row by the one or more control lines; and
at least two memory blocks connected to two memory controllers by a same control line.

34. The image sensor of claim 33,
said second row driver located on an opposite side of said pixel array from said first row driver.

35. The image sensor of claim 33,
said second row driver controllable to provide a same one or more control signals on the one or more control lines as are provided by the first row driver on the one or more control lines.

36. The image sensor of claim 33, further comprising:
a first controller for controlling the first row driver;
a second controller for controlling the second row driver; and
a clock tree for distributing a clock signal from an input pad to the first controller and the second controller approximately simultaneously.

37. The image sensor of claim 33, further comprising:
a first controller for controlling the first row driver;
a second controller for controlling the second row driver; and
a control signal tree for distributing a control signal from a control input pad to the first controller and the second controller approximately simultaneously.

38. A method in an image sensor, comprising:
driving from a first row driver one or more control signals over one or more control lines to one or more pixels;
driving from a second row driver the one or more control signals over the one or more control lines to the one or more pixels; and removing excess charge from a photodiode of a pixel of the one or more pixels through an antiblooming channel to a drain of a source follower transistor of another pixel of the one or more pixels when a transfer gate of the pixel is closed.

39. The method of claim 38,
said driving from the second row driver occurring concurrently with said driving from the first row driver.

40. The method of claim 38,
said second row driver driving the one or more control signals over the one or more control lines from an opposite direction as a direction in which the first row driver drives the one or more control signals over the one or more control lines.

* * * * *